(12) United States Patent
Spark

(10) Patent No.: US 7,464,785 B2
(45) Date of Patent: Dec. 16, 2008

(54) OFF ROAD VEHICLE

(76) Inventor: Ian James Spark, P.O. Box 377, Churchill (AU) 3842

( * ) Notice: Subject to any disclaimer, the term of this patent is extended or adjusted under 35 U.S.C. 154(b) by 369 days.

(21) Appl. No.: 10/889,165

(22) Filed: Jul. 13, 2004

(65) Prior Publication Data
US 2005/0217906 A1  Oct. 6, 2005

(51) Int. Cl.
*B62D 6/00* (2006.01)
(52) U.S. Cl. .................. 180/236; 180/242; 180/411
(58) Field of Classification Search .............. 180/234, 180/236, 242
See application file for complete search history.

(56) References Cited
FOREIGN PATENT DOCUMENTS

| EP | 221547 A | * | 5/1987 |
|---|---|---|---|
| EP | 325298 B1 | * | 4/1994 |
| WO | WO 0032462 A1 | * | 6/2000 |
| WO | WO 0228677 A1 | * | 4/2002 |
| WO | WO 03059720 A1 | * | 7/2003 |

* cited by examiner

*Primary Examiner*—Kevin Hurley

(57) ABSTRACT

The invention describes vehicles where the steering effect of the driver-selected wheel angles is made identical to the steering effect of positively and independently driving the driven wheels. A method of compensating for the linear portions of the slip angles of all wheels and the linear portions of the longitudinal slip of the driven wheels is described where the slip angles and longitudinal slips are deduced from the forces acting on the wheels. Methods of measuring the slip angles and longitudinal slips of all wheels by means of two dummy castors are also described. Vehicles where the steering effect of the driver-selected wheel angles is made identical to the steering effect of positively and independently braking all wheels are also described. Means of applying the above principles to vehicles with either hydrostatic or mechanical drives are also described, including simplified vehicles with only two steerable wheels.

16 Claims, 16 Drawing Sheets

OFF ROAD VEHICLE

TECHNICAL FIELD

The invention relates to a means of increasing the tractability, stability, manoeuvrability and safety of wheeled vehicles while at the same time minimising fuel consumption d damage to the ground traversed.

DESCRIPTION OF PRIOR ART

The following patents or patent applications allude to the problem to be solved by the present invention, but do not go far enough to describe a complete solution.

WO 98/19875 A1 (GRANT, publication date 14 May 1998) merely states that the drive wheel speeds and angles are calculated by a computer.

WO 00/32462 A1 (Grant, publication date 19 Jun. 2000) describes equations for drive wheel speeds and wheel angles. These equations are hard to decipher since the variables are poorly defined. The equations for wheel speeds are clearly different from those described in the present invention, and as such must be incorrect. Grant's equations for wheel speed may approximate to the correct equations when the radius of curvature of the path of the vehicle is large.

U.S. Pat. No. 4,237,994 A (MCCOLL, priority date Aug. 17, 1978) refers to "desired" wheel speeds and "desired" wheel angles, but does not say what these are or how the are calculated.

PCT/AU95/00264=WO 95/30567 A1 (SPARK, priority date May 6, 1994) describes two wheel drive vehicles and four wheel drive vehicles where skidding and scuffing are substantially avoided. Here equations are given whereby the wheel angles are calculated from dimensions of the vehicle and the speeds of the left hand and right hand drive wheels—where the latter are selected by the driver by means of left hand and right hand steering levers.

There are two disadvantages of this means of driver control. Firstly there is only a limited range of wheel speed ratios for which scuffing can be avoided. Outside this range there are no wheel angles that can avoid scuffing. Secondly for any allowable wheel speed ratio, there are generally two sets of wheel angles, which will avoid scuffing. One set will involve a large radius of curvature for the path of the vehicle and small wheel angles, and the other vice versa.

Although the use of a steering wheel or rotatable joystick is foreshadowed, the control equations given are clumsy and inadequate in so far as they deduce the drive wheel speed ratio from the rotation of the steering wheel or joystick according to an empirical equation, and then deduce the wheel angles from the said drive wheel speed ratio. This means that the disadvantages, alluded to above, that are associated with the use of steering levers (with their unlimited range of drive wheel speed ratios) will still apply.

U.S. Pat. No. 4,717,175 (ARAI et al, priority date Nov. 7, 1986) describes a means of correcting for the slip angles of the steerable wheels. However there is no mention of making the steering effect of the effective wheel angles identical to the steering effect of the speed of the driven wheels.

U.S. Pat. No. 5,025,879, (MITSUNARI, priority date Jan. 23, 1989) describes means of correcting for all slip angles so that the actual centre of curvature of the path of the vehicle is made identical to the centre of curvature selected by the driver. However the means of making these corrections is significantly different from those described below in the present invention.

U.S. Pat. No. 5,143,400, (MILLER et al, priority date Jul. 5, 1991) describes means of continuously adjusting the toe in of the steerable wheels. This allows correction for unintended changes to the toe in due to the operation of the suspension system. However there is no mention of correcting for the slip angles of the steerable wheels.

U.S. Pat. No. 5,402,344, (REISTER et al, priority date Aug. 23, 1993) describes a control system architecture to control the speed of each driven wheel indirectly by controlling the torque transmitted to each driven wheel. Although "slip" is mentioned, it is not the slip between each driven wheel and the ground. Rather Reister's "slip" refers to the conflict which results when the centre of curvature of the path of the vehicle which would be produced by the individual speeds of one pair of driven wheels, differs from the centre of curvature which would be produced by the individual speeds of another pair of driven wheels.

PCT/AU01/01247=WO 02/28677 A1 (SPARK, priority date Oct. 3, 2000) does disclose a set of equations for calculating the individual speeds of the driven wheels and the angles of all the wheels that will ensure that the steering effect of the speed of the individual driven wheels is identical to the steering effect of all the wheel angles. The steering effect of a means of steering is defined as the centre of curvature of the path of the vehicle that would result if the said steering effect was acting alone.

However the equations disclosed by SPARK (01247) strictly only apply to the effective wheel angles and the effective speed of the drive wheels. The effective wheel angles are the actual wheel angles corrected for their respective slip angles. Similarly the effective speed of the driven wheels is the actual speed of the driven wheels corrected for their respective longitudinal slips. SPARK (01247) does not take slip angles and longitudinal slips into account.

SPARK (01247) only discloses one driver interface. This is a rotatable joystick, which is used to select both the centre of curvature of the path of the vehicle and the root mean square wheel speed.

SPARK (01247) discloses hydrostatic wheel motors as the means of driving the driven wheels. This drive means has the advantage of allowing a range of wheel angles in excess of 180 degrees. The disadvantage of this drive means is that it tends to be less efficient than a mechanical drive.

The shortcomings outlined above will be overcome in the invention described below.

BACKGROUND

There are two basic methods of maneuvering a wheeled vehicle. One method is to turn one or more steerable wheels. The other method is to drive one or more left hand wheels independently of one or more right hand wheels. In general these two steering systems will conflict with one another when each tries to achieve a different centre of curvature for the path of the vehicle. This conflict causes a braking effect, which results in fuel wastage, scuffing of the ground traversed and associated tyre wear.

The traditional method of avoiding conflict between the two basic steering systems is to disable one system so that it cannot conflict with the remaining system. For example in a traditional road vehicle, the steering effect of driving the drive wheels at the same speed is eliminated by incorporating a differential into the drive train to the driving wheels. Conversely in a zero turn radius vehicle which is steered by driving the left hand drive wheel independently of the right hand drive wheel, the steering effect of one or more non driven wheels is eliminated by rendering the latter free to turn to any angle. That is, they are turned into castors.

The Problems to be Solved

Unfortunately, making one steering system compliant with the other leads to stability and traction problems when the vehicle is operated in difficult conditions. If the sideways, forwards or backwards force on the vehicle increases and/or the coefficient of friction between the tyres and the ground decreases, the system used to maneuver the vehicle will eventually fail. For example, the differential becomes the Achilles' Heel of the traditional tractor when working on steep terrain, and especially in slippery conditions. In this environment weight is transferred from the uphill drive wheel making it liable to spinning. Although the stability of the traditional tractor can be improved by the use of a limited slip differential or a lockable differential, it is somewhat illogical to provide a differential in the first instance along with a subsidiary system which either impedes its operation, or stops it altogether.

Similarly it can be seen that the Achilles' heel of the zero turn radius vehicle when traversing a steep slope are the non-driven castors. Because these castors cannot exert any sideways force on their end of the vehicle, the tendency for this end to swing down the hill can only be prevented by the two drive wheels applying opposing forces to the vehicle— even though they may be driven at the same speed. As the steepness of the slope traversed increases, the uphill drive wheel eventually loses traction and the front of the vehicle swings down the hill. In short, the grip of the drive wheels on the ground is exhausted by the drive wheels fighting against each other in providing the torque necessary to stop the castored end of the vehicle swinging down the hill.

A method of overcoming the problems of traction and stability is to allow both steering systems to operate, but to allow one steering system to dominate the other. In this case the stability and traction problems are reduced at the expense of the introduction of a scuffing problem on turning. For example the elimination of the differential from the rear axle of four wheeled motor bikes improves traction at the expense of introducing a scuffing problem.

A more extreme example of conflict between the two basic methods of maneuvering a vehicle occurs in skid steer vehicles (both wheeled and tracked). In this case the dominant steering system is the independent drive to the right hand and left hand drive wheels or tracks. The second enabled but dominated steering system is the wheel or track angle which is usually fixed at zero degrees and tends to drive the vehicle straight ahead. The conflict between the two steering systems causes the vehicle to take a path which is a compromise between the paths that would be produced by each system alone. This method of maneuvering causes extreme scuffing with associated ground damage, fuel wastage and tyre or track wear.

In traditional vehicles, rotation and translation are generally linked. Translation of the vehicle along a curved path usually involves rotation, and rotation of the vehicle always involves translation. As a consequence, rotation and translation in a confined space can be a problem. Vehicles steered by independently driving the left and right hand wheels have improved manoeuvrability since they can be made to rotate about their own centre. This is pure rotation (i.e. without translation). Manoeuvrability can be further increased by allowing translation in any direction without the need for rotation. This pure translation is sometimes referred to as crab steering.

The Solution Proposed Previously

The essential feature of the invention previously proposed by Spark (Australian Provisional Application PR 0473 (Mar. 10, 2000) and Patent Cooperation Treaty Application PCT/AU/01247 (Mar. 10, 2001)) is that both basic systems of maneuvering a vehicle are to be used in unison so that they both try to produce the same centre of curvature for the path of the vehicle. With both systems reinforcing each other it will be possible to effectively maneuver the vehicle in much more difficult conditions than if only one system was used with the other system either disabled or dominated. Furthermore any centre of curvature can be selected by the driver, which further improves the manoeuvrability of the present invention. This enables the invented vehicle to execute either pure rotation or pure translation or any combination of translation and rotation.

The preferred means of driver control of the four wheel steering/flour wheel drive variant of the previously proposed invention is by means of a rotatable joystick. This maximizes the manoeuvrability of the vehicle by allowing independent translation and rotation of the vehicle. In this means of driver control, the direction of translation of the vehicle is determined by the direction of displacement of the joystick, whereas the rotation of the vehicle is determined by the degree of rotation of the joystick. The amount of displacement of the joystick determines the root mean square of the four wheel speeds. Pure translation occurs when the joystick is displaced but not rotated. Pure rotation occurs when the joystick is twisted as far as it will go.

Alternatively, two separate devices could be used for driver control. One joystick could be used to determine the radius of curvature of the path of the vehicle and the root mean square wheel speed, and the second joystick could be used to determine the direction of the centre of curvature.

Alternatively, a joystick, steering wheel, knob or lever could be used to determine the radius of curvature of the path of the vehicle, and a separate joystick could be used to determine the direction of the centre of curvature of the path of the vehicle and the root mean square wheel speed.

Deficiency of the Previously Proposed Invention

The patent applications cited above enumerate the control equations that must be satisfied if the steering effect of the wheel speeds is to be identical to the steering effect of the wheel angles. However these applications do not take into account either the slip angles of the tyres or the longitudinal slip of these tyres. If these effects are ignored the effective centre of curvature of the path of the vehicle may be different the centre selected by the driver.

DRAWINGS

In order that the present invention may be more clearly understood, some preferred embodiments thereof will now be described with reference to the accompanying drawings. Although a four wheel steering/four wheel drive vehicle will be described, it will be appreciated that the principles invoked can be applied to any vehicle with more than one wheel.

FIG. 6 also shows the relationship between angle of each castor and its velocity across the ground and the angles of the four wheels and the velocity of these wheels across the ground.

OVERCOMING THE DEFICIENCIES OF THE PREVIOUSLY PROPOSED INVENTION

The essential feature of the present invention is that the slip angle of the tyres and the longitudinal slip of these tyres are taken into account so that the difference in the effects of the two basic steering systems is reduced, if not totally eliminated.

Figure 1:
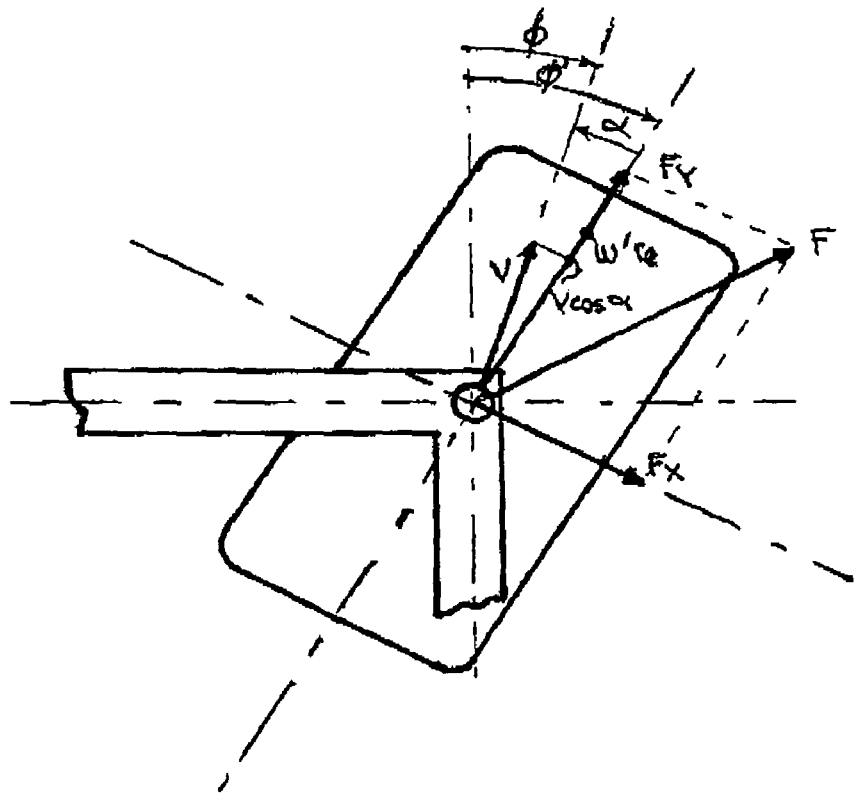
FIG. 1 shows the relationship between the actual wheel angle $\phi'$, the effective wheel angle $\phi$ and the slip angle $\alpha$.

Reference to FIG. 1 shows that the effective angle $\phi$ of any wheel is given by the equation:

$$\phi = \phi' + \alpha;$$

where $\phi$ is the actual wheel angle, a is the slip angle of the tyre, V is the velocity of the wheel across the ground, $F_y$ is the Longitudinal force on the wheel (in the plane of the wheel) and $F_x$ is the Lateral (or cornering) force on the wheel (parallel to the axis of the wheel). The sign convention used here is that clockwise turning of the wheels (about a substantially vertical axis) is positive and negative for the front and rear wheels respectively. The same convention is used for the slip angles, which are the difference between the direction the wheel moves across the around and the rolling direction of the wheel.

Figure 2:
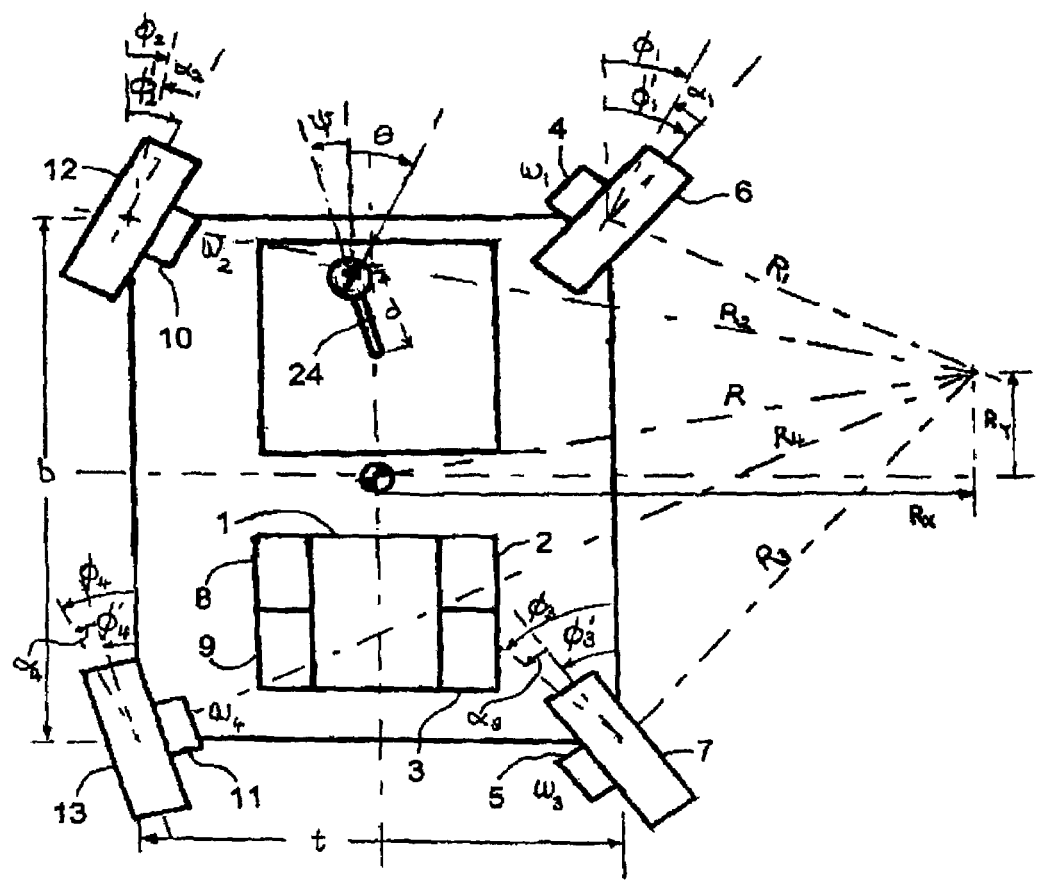
FIG. 2 shows the desired relationship between the effective wheel angles and the effective wheel speeds for a four wheel steering/four wheel drive vehicle.

According to the above sign convention, in FIG. 2, the slip angles $\alpha_1$ and $\alpha_2$ of the front wheels are negative and the slip angles $\alpha_3$ and $\alpha_4$ of the rear wheels are positive.

Note that the direction of the slip angle is always opposite to the direction of the Lateral (or cornering) force $F_x$ exerted on the wheel by the ground.

With respect to the wheels, "rotational velocity" and "wheel speed" mean the same thing. Typically they would both be measured in radians per second. The effective wheel speed is the velocity of the wheel across the ground resolved in its rolling direction divided by the rolling radius of the wheel.

If the true longitudinal slip i is defined by:

$$i = ln(\omega' r_e / V \cos \alpha)$$

Where $r_e$ is the effective radius of the wheel, $\alpha$ is the slip angle and $\omega'$ is the actual speed of rotation of the wheel. Note that the same equation can be used for both traction and braking, where i will be negative for the latter case.

Hence the effective speed of rotation of the wheel is given by:

$$\omega = V \cos \alpha / r_e = \omega' \exp[-i]$$

The Preferred Embodiment

In the four wheel steering/four wheel drive variant of the invention depicted in FIG. 2, an internal combustion engine 1 drives two right hand variable displacement hydraulic pumps 2 and 3 which in turn drive hydraulic motors 4 and 5 mounted in the steerable front and rear right hand wheels respectively. The internal combustion engine 1 also drives left hand variable displacement pumps 8 and 9 which in turn drive hydraulic motors 10 and 11 which are mounted in the steerable front and rear left hand wheels 12 and 13 respectively.

The effective angles of the wheels 6, 12, 7 and 13 are shown as $\phi_1, \phi_2, \phi_3$ and $\phi_4$ respectively. The effective rotational speed of the wheels 6, 12, 7 and 13 are $\omega_1, \omega_2, \omega_3$ and $\omega_4$ respectively.

The driver controls the vehicle by selecting the radius of curvature of the vehicle's path and the sense of rotation by rotating the joystick. If the joystick is not turned the radius of curvature of the path of the vehicle will be infinity and the vehicle will move in a straight line parallel to the direction of displacement of the joystick. If the joystick is twisted as far as it will go in a clockwise direction, the radius of curvature of the path of the vehicle will be zero and the vehicle will rotate clockwise about its own centre. Between these two extremes the radius of curvature of the path of the vehicle R is given by:

$$\frac{R}{t} = \cot(90°\theta/\theta_{max}) = (R_X^2 + R_Y^2)^{1/2}/t$$

Where t is the track of the vehicle, $\theta$ is the rotation of the joystick and $\theta_{max}$ is the maximum rotation of the joystick 24.

If the driver displaces the rotatable joystick 24 at an angle $\psi$ to the straight ahead position, the direction of the of curvature of the path of the vehicle will by at right angles to the direction of joystick displacement and $R_X$ and $R_Y$ will be given by the following equations:

$$R_X = R/(\tan^2\psi+1)^{1/2} = R\cos\Psi$$

$$\text{and } R_Y = R\tan\psi/(\tan^2\psi+1)^{1/2} R\sin\Psi$$

The driver selects the direction of the centre of curvature by displacing the joystick 24 at right angles to this direction. The centre of curvature of the path of the vehicle is now specified by the two components $R_X$ and $R_Y$. He selects the root mean square of the four wheel speeds by the amount of displacement of the joystick 24.

The control system then rotates the four drive wheels to the following angles:

$$\tan\phi_1 = (b/2 - R_Y)/(R_X - t/2) = \tan(\phi_1' + \alpha_1)$$

$$\tan\phi_2 = (b/2 - R_Y)/(R_X + t/2) = \tan(\phi_2' + \alpha_2)$$

$$\tan\phi_3 = (b/2 + R_Y)/(R_X - t/2) = \tan(\phi_3' + \alpha_3)$$

$$\tan\phi_4 = (b/2 + R_Y)/(R_X + t/2) = \tan(\phi_4' + \alpha_4)$$

Where b is the wheel base of the vehicle, $R_Y$ is the displacement of the centre of curvature forward of the centre of the vehicle and $R_X$ is the displacement of the centre of curvature to the right of the centre of the vehicle.

The amount of displacement of the joystick d determines the root mean square of the four wheel speeds (RMSWS) according to the equation:

$$RMSWS = Kd = (\omega_1^2 + \omega_2^2 + \omega_3^2 + \omega_4^2)^{1/2}/2$$

where K is an appropriate constant.

The individual wheel speeds are given by the equations:

$$\omega_1 = KdR_1/RMSR = \omega_1'\exp[-i_1] \text{ where } R_1^2 = (b/2 - R_Y)^2 + (R_X - t/2)^2$$

$$\omega_2 = KdR_2/RMSR = \omega_2'\exp[-i_2] \text{ where } R_2^2 = (b/2 - R_Y)^2 + (R_X + t/2)^2$$

$$\omega_3 = KdR_3/RMSR = \omega_3'\exp[-i_3] \text{ where } R_3^2 = (b/2 + R_Y)^2 + (R_X - t/2)^2$$

$$\omega_4 = KdR_4/RMSR = \omega_4'\exp[-i_4] \text{ where } R_4^2 = (b/2 + R_Y)^2 + (R_X + t/2)^2$$

And RMSR is the root mean square radius, which is given by:

$$RMSR = (R_1^2 + R_2^2 + R_3^2 + R_4^2)^{1/2}/2 = (R_X^2 + R_Y^2 + t^2/4 + b^2/4)^{1/2}$$

Note that when the rotation of the joystick $\theta$ is a maximum the radius of curvature will be zero and the direction of the displacement d of the joystick 24 will be immaterial. It will be natural for the driver to push the joystick 24 forward in this case to commence rotation. Pulling the joystick back will commence rotation in the opposite direction.

If the above equations for wheel angles and wheel speeds are satisfied then the two basic methods of steering the vehicle will reinforce each other. Such a vehicle would combine the traction and stability of skid steer vehicles with the non scuffing advantages of traditional road vehicles. However the vehicle described above has much greater manoeuvrability since it is capable of both pure rotation and pure translation (in any direction).

As slip angles and longitudinal slip are difficult to measure on a continuous basis, these parameters will be estimated from the measurement of lateral force on each wheel $F_x$, the longitudinal force on each wheel $F_y$, and the vertical force on each wheel $F_z$.

These forces will be measured by means of load cells 14 or 20 attached to the support for each wheel. In order to eliminate short term (i.e. transient) effects these forces will be averaged over a period of say 2 seconds for $F_x$ and $F_y$ and 5 seconds for $F_z$.

In the present invention, only the linear component of the slip angle will be corrected for. This will lead to full compensation in the linear region of the lateral force versus slip angle curve and partial compensation outside this region. Full compensation for slip angle outside the linear region is not desirable as it could lead to instability in the angle control system. In the present invention the maximum slip angle compensation will be less than 10 degrees.

The slip angle correction $\alpha'$ is given by the equation:

$$\alpha' = F_x/C_\alpha$$

Where $C_\alpha$ is the cornering stiffness, which is given by the equation:

$$C_\alpha = (dF_x/d\alpha)_{\alpha \to 0} = K_n F_z^n + K_n'$$

Where $K_n$, $K_n'$ and n and constants which characterise the tyre. In general n will lie between 0.5 and 0.8.

Thus $\alpha' = F_x/(K_n F_z^n + K_n')$

In the present invention, only the linear component of the longitudinal slip will be corrected for. This will lead to full compensation for longitudinal slip in the linear region of the Longitudinal force versus longitudinal slip curve and partial compensation outside this region. Full compensation for longitudinal slip outside the linear region is not desirable as this may lead to instability of the wheel speed control system at high longitudinal slips. In the present invention the maximum longitudinal slip compensated for will be 0.1.

The longitudinal slip compensated for is given by the equation:

$$i = F_y/C_s$$

Where $C_s$ is the gradient of the longitudinal force $F_y$ versus longitudinal slip curve, and is given by:

$$C_s = (dF_y/di)_{i \to 0} = K_m F_z^m + K_m'$$

Where $K_m$, $K_m'$ and m are parameters which characterise the tyre.

Thus $i' = F_y/(K_m F_z^m + K_m')$

Thus in order to compensate for slip angle $\alpha'$, $F_x$ and $F_z$ must be measured continuously and the constants $K_n$, $K_n'$ and n determined for the tyres used.

Similarly in order to compensate for longitudinal slip i, $F_y$ and $F_z$ must be measured continuously and the parameters $K_m$, $K_m'$ and m determined for the tyres used.

An onboard computer will calculate the slip angle compensation $\alpha'$ and longitudinal slip compensation i for each wheel. These two values will then be used in the actual wheel angle and actual wheel speed control equations.

Figure 3:
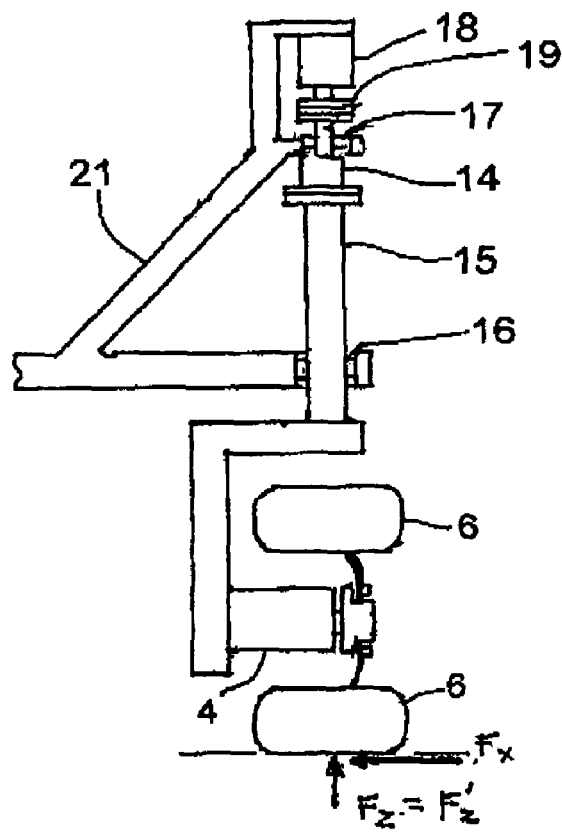
FIG. 3 shows a means of directly measuring the forces acting on any wheel and the means of driving and turning this wheel.

FIG. 3 shows one means of measuring $F_x$, $F_y$ and $F_z$ using a triaxial load 14 cell fixed to the shaft 15 used to turn each wheel about a vertical axis. The lower end of the vertical shaft 15 is supported by a roller bearing 16, which allows the shaft to rotate and slide freely (and tilt a small amount). The top of the load cell 14 is supported by the chassis via a self aligning bearing 17. The laws of the lever can then be used to deduce the force exerted on the wheel 6 through the contact patch from the forces measured by the load cell 14.

The wheel angle is measured and the wheel turned to the correct angle by a steering motor 18, which is connected to the top of the vertical shaft 15 by means of an Oldham coupling 19. This coupling allows torque to be transmitted to the vertical shaft without any lateral, longitudinal or vertical force being transmitted to the vertical shaft 15.

Figure 4:
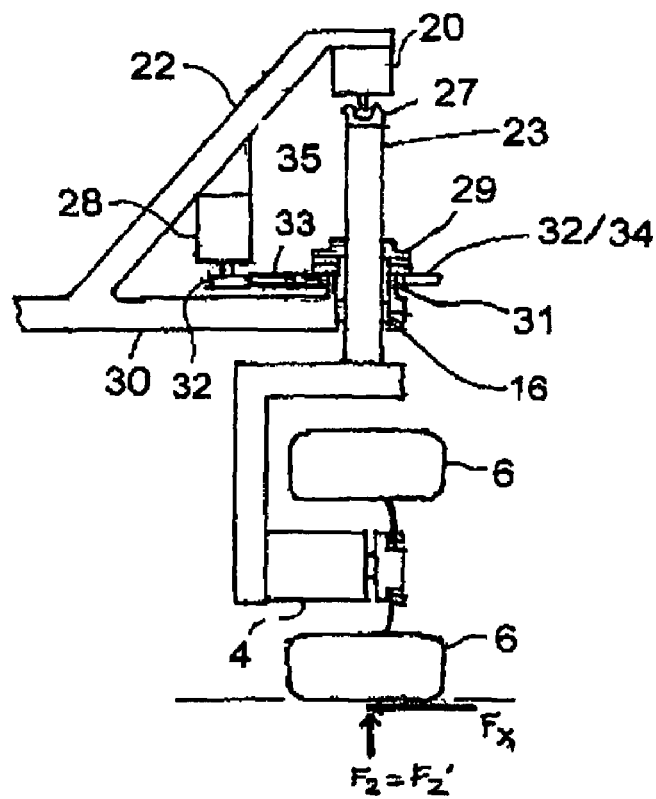
FIG. 4 shows an alternative means of indirectly measuring the forces acting on any wheel and the means of driving and turning this wheel.

FIG. 4 shows an alternative configuration where the triaxial load cell 20 is connected to the vehicle chassis 22. In this case the load cell 20 measures $F_x'$, $F_y'$ and $F_z'$ relative to the vehicle frame of reference. In this case the top of the vertical shaft is connected to the load cell by means of a ball joint 27. A disadvantage of this configuration is that it is more difficult to rotate the vertical shaft 23 by means of the steering motor 28. In this case the Oldham coupling 29 needs to surround the vertical shaft 23, such that the input to the coupling is supported by the chassis 30 via a roller bearing 31 and rotated by the steering motor 28 by means of gears, sprockets 32 and chain 33 or toothed pulley 34 and toothed belt 35. The output of the Oldham coupling 29 is connected to the vertical shaft 23.

Figure 5:
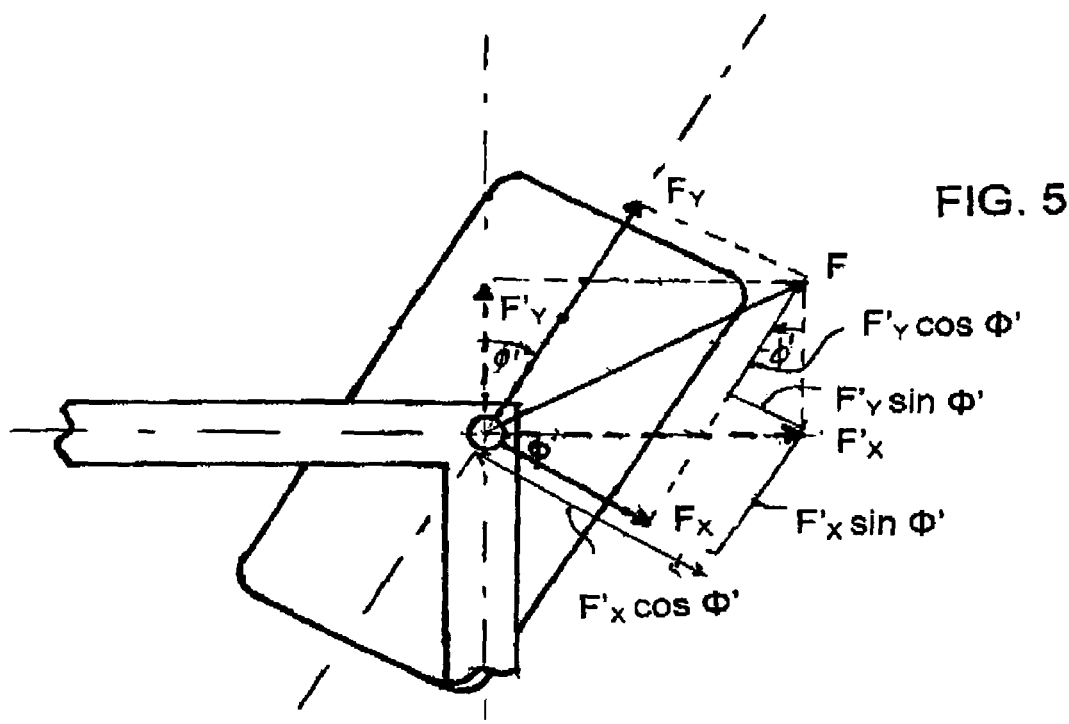
FIG. 5 shows the relationship between the forces acting on the wheel when resolved in the wheel frame of reference and the vehicle frame of reference.

FIG. 5 shows how the forces relative to the wheel frame of reference can be deduced from the forces relative to the vehicle frame of reference by means of the following equations.

$$F_y = F_y' \cos \phi' + F_x' \sin \phi'$$

$$F_x = F_x' \cos \phi' - F_y' \sin \phi'$$

$$F_x = F_z' \text{ where } \phi' \text{ is the actual wheel angle}$$

As an alternative to deducing the linear portion of the slip angles and longitudinal slips of the wheels, the whole slip angles and whole longitudinal slips can be measured on a continuous basis.

In the present invention slip angles $\alpha$ and true longitudinal slip i are measured by means of two castors 36 and 37. These castors are pressed against the ground traversed by some form of spring (either mechanical or pneumatic). Each castor measures the direction and velocity of movement of the castors relative to the ground traversed. The angle and velocity of the castors allow the centre of curvature of the path of the vehicle and the velocity of the centre of the vehicle to be calculated. The slip angle and true longitudinal slip of each wheel can also be calculated.

Although the two castors can be located anywhere on the body of the vehicle, accuracy is increased if they are as widely separated as possible. In the derivation below the front castor 36 is located midway between the front wheels and the rear castor 37 is located midway between the rear wheels.

These castors can be referred to as dummy castors since they support a negligible proportion of the weight of the vehicle. These castors are pressed against the ground with only sufficient force to keep them in contact with the ground and ensure there is no motion of the contact patch of the castor relative to the ground. The first function of these dummy castors is to determine the direction of motion of the point on the vehicle at which they are located relative to the ground. The second function of these dummy castors is to determine the speed of the point on the vehicle at which they are located relative to the ground.

Figure 6:
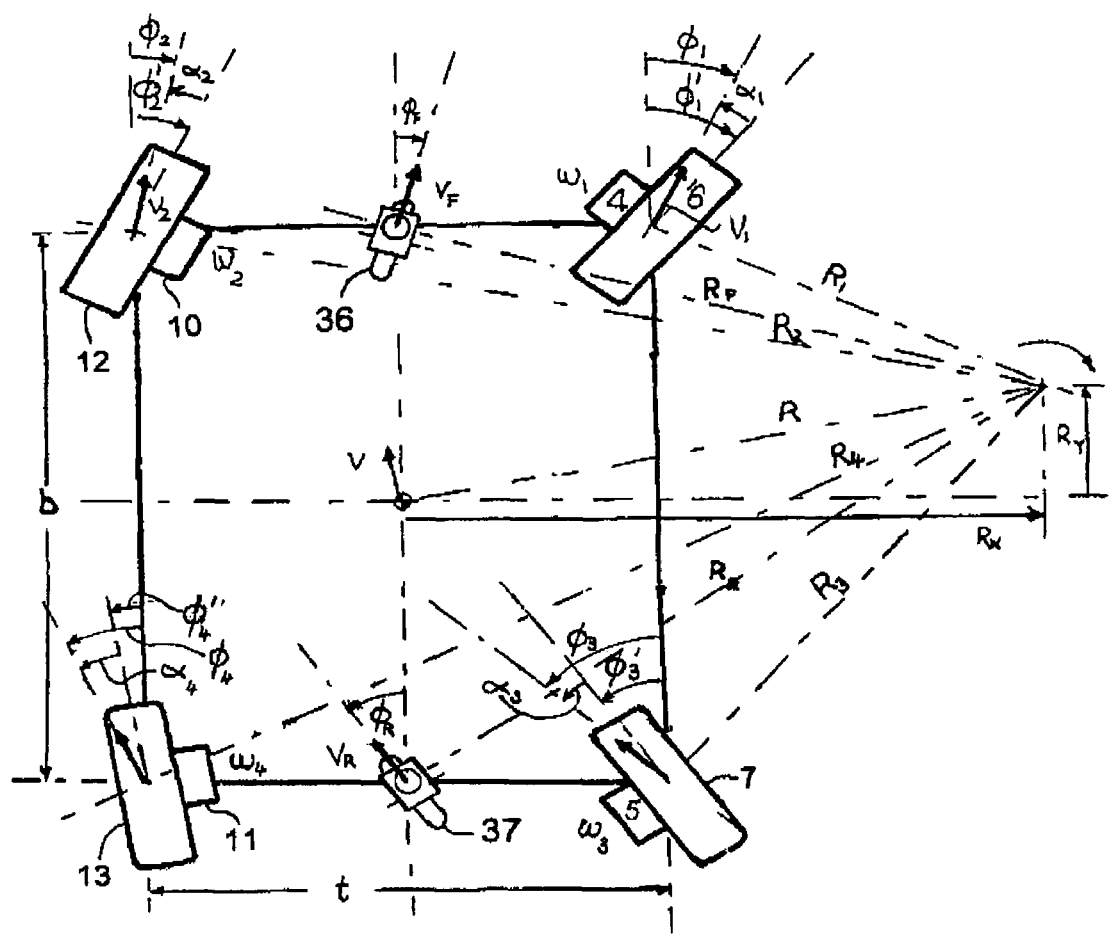
FIG. 6 shows the relationship between the angle of front and rear castors, the radius of curvature of the path of each castor and the centre of curvature of the path of the vehicle.

Reference to FIG. 6 shows that $\phi_F$ and $\phi_R$ are the rotation of the front and rear castors from the straight ahead position in a clockwise and anti clockwise direction respectively. $R_F$ and $R_R$ are the radius of curvature of the path of the front and rear castors respectively.

The displacement of the centre of curvature of the path of the vehicle to the right of the vehicle $R_x$ is given by the equation:

$$R_x = R_R \cos \phi_R = R_F \cos \phi_F$$

$$\therefore R_F/R_R = \cos \phi_R / \cos \phi_F = V_F/V_R$$

where $V_F$ and $V_R$ are the velocity of the front and rear castors respectively.

The displacement of the centre of curvature of the path of the vehicle forward of the transverse axis of the vehicle $R_Y$ is given by the equation:

$$b/2 - R_Y = R_F \sin \phi_F \text{ and } b/2 + R_Y = R_R \sin \phi_R$$

Where b is the wheel base of the vehicle.

Adding the last two equations yields:

$$b = R_F \sin \phi_F + R_R \sin \phi_R$$

Substituting for $R_R$ where $R_R = R_F \cos \phi_F / \cos \phi_R$ yields:

$$R_F = b/(\tan \phi_R + \tan \phi_F) \cos \phi_F$$

And $R = b/(\tan \phi_R + \tan \phi_F) \cos \phi_R$ $$\therefore R_x = b/(\tan \phi_R + \tan \phi_F)$$

and $R_Y = b(\tan \phi_R - \tan \phi_F)/2(\tan \phi_R + \tan \phi_F)$

The effective wheel angles and slip angles can now be calculated from the equations:

$$\tan \phi_1 = \tan(\phi_1' - \alpha_1) = \tan \phi_F/(1 - t(\tan \phi_R + \tan \phi_F)/2b)$$

$$\tan \phi_2 = \tan(\phi_2' - \alpha_2) = \tan \phi_F/(1 + t(\tan \phi_R + \tan \phi_F)/2b)$$

$$\tan \phi_3 = \tan(\phi_3' - \alpha_3) = \tan \phi_R/(1 - t(\tan \phi_R + \tan \phi_F)/2b)$$

$$\tan \phi_4 = \tan(\phi_4' - \alpha_4) = \tan \phi_R/(1 + t(\tan \phi_R + \tan \phi_F)/2b)$$

FIG. 6 also shows the relationship between the castor speeds and angles and the wheel speeds and angles.

The rate of rotation of the vehicle $\Omega$ is given by:

$$\Omega = V_F/R_F = V_1/R_1 = V_2/R_2 = V_3/R_3 = V_4/R_4 = V_R/R_R$$

Where $V_F$, $V_R$, $V_1$, $V_2$, $V_3$, and $V_4$ are the velocities of the front and rear castors and the front left wheel 12, the front right wheel 6, the rear left wheel 13 and the rear right wheel 7 respectively. $R_F$, $R_R$, $R_1$, $R_2$, $R_3$, and $R_4$, are the radii of curvature of the path of the front and rear castors and the front left wheel 12, the front right wheel 6, the rear left wheel 13 and the rear right wheel 7 respectively.

$$\therefore V_1 = V_F(R_x - t/2) \cos \phi_F / R_x \cos \phi_1$$

$$V_2 = V_F(R_x + t/2) \cos \phi_F / R_x \cos \phi_2$$

$$V_3 = V_R(R_x + t/2) \cos \phi_R / R_x \cos \phi_3$$

$$V_4 = V_R(R_x - t/2) \cos \phi_R / R_x \cos \phi_4$$

The true longitudinal slips of the four wheels $i_1$, $i_2$, $i_3$, and $i_4$ are given by:

$$i_1 = \ln(\omega_1' r_e / V_1 \cos \alpha_1)$$

$$i_2 = \ln(\omega_2' r_e / V_2 \cos \alpha_2)$$

$$i_3 = \ln(\omega_3' r_e / V_3 \cos \alpha_3)$$

$$i_4 = \ln(\omega_4' r_e / V_4 \cos \alpha_4)$$

Where $\omega_1'$, $\omega_2'$, $\omega_3'$ and $\omega_4'$ are the angular velocities of each wheel where $r_e$ is the effective wheel radius—which in this case is assumed to be the same for all wheels.

To correct for slip angles and true longitudinal slip the following control strategy will be employed:
(1). The driver selects the desired $R_x'$, $R_y'$ and RMSWS. If a rotatable joystick is used $\psi$, $\theta$, and d are selected.
(2). The computer calculates the desired angles and speed for all four wheels.
(3). As slip angles and longitudinal slip cannot be measured yet, the computer implements the above angles and speeds.
(4). The castors now allow calculation of the effective wheel angles and wheel speeds. Slip angles and longitudinal slip are also calculated.
(5). The slip angles are now added to the actual front wheel angles and subtracted from the actual rear wheel angles in order to achieve the desired effective wheel angles. This step assumes the slip angles will not be changed by a small change in each wheel angle.
(6). The castor angles and speeds are remeasured. Note that the desired castor angles are given by the equations:

$$\tan \phi_F = (b/2 - R_Y')/R_X' \text{ and } \tan \phi_R = (b/2 + R_Y')/R_X'$$

(7). In an attempt to correct the effective wheel speeds to the desired wheel speed, the wheel speed error is added to the actual wheel speed. Once again it is assumed that the speed error will not be changed by this process.
(8). If the desired centre of vehicle is still not achieved, steps 4 to 7 can be repeated.

It is expected that the energy required to move or rotate the vehicle will be a minimum when the root mean square of all the slip angles and the root mean square of all the longitudinal slips are also minimum. An intelligent control system could fine tune the actual wheel angles and wheel speeds in an attempt to find these minimums. The accuracy of this assumption may be increased if the individual slip angles and longitudinal slips are divided by the vertical loads applied to the respective wheels.

In principle the general vehicle described above can be simplified by restricting the desired centre of curvature of the path of the vehicle to the transverse axis of the vehicle. In this case the front and rear effective wheel speeds for each side of the vehicle will be the same—as will the effective wheel angles.

However when slip angles are taken into account, each of the four actual wheel angles will be different. Similarly when longitudinal slip is taken into account, each of the four actual wheel speeds may also be different. If four wheel speed control systems and four wheel angle control systems are required no simplification is possible. However it will be shown below that simplification is still possible if the effective centre of curvature of the vehicle is manipulated to the transverse axis of the vehicle. In this case only one speed control is required for each side of the vehicle.

Figure 7A:
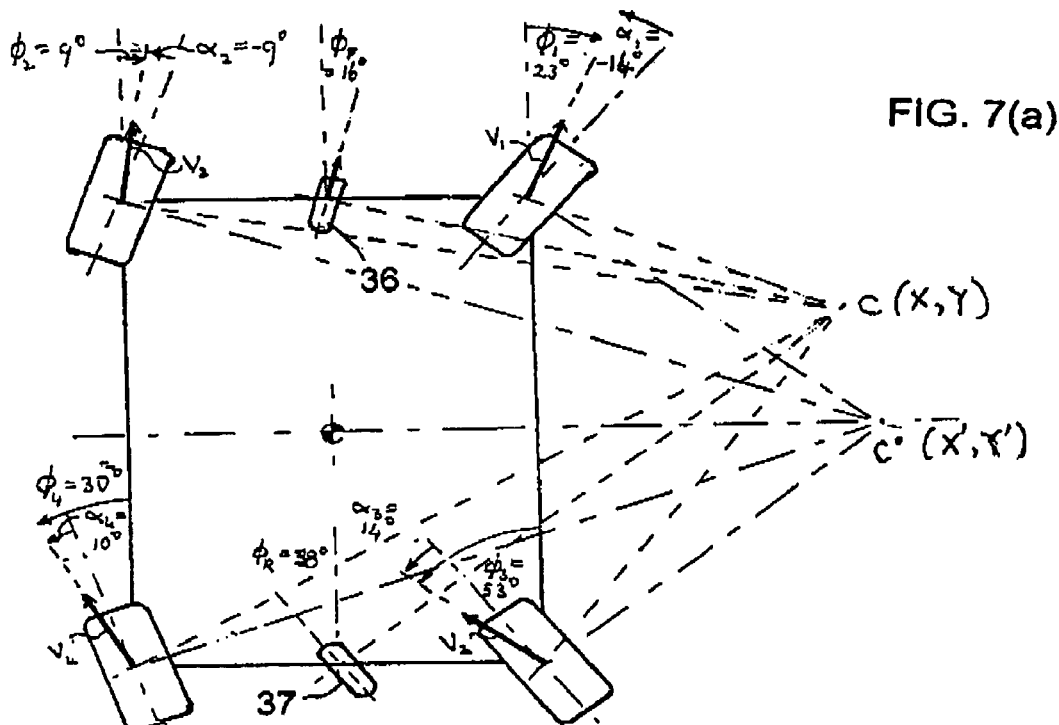
FIG. 7(a) shows the initial castor angle and wheel angle configuration for a simplified vehicle.
Figure 7B:
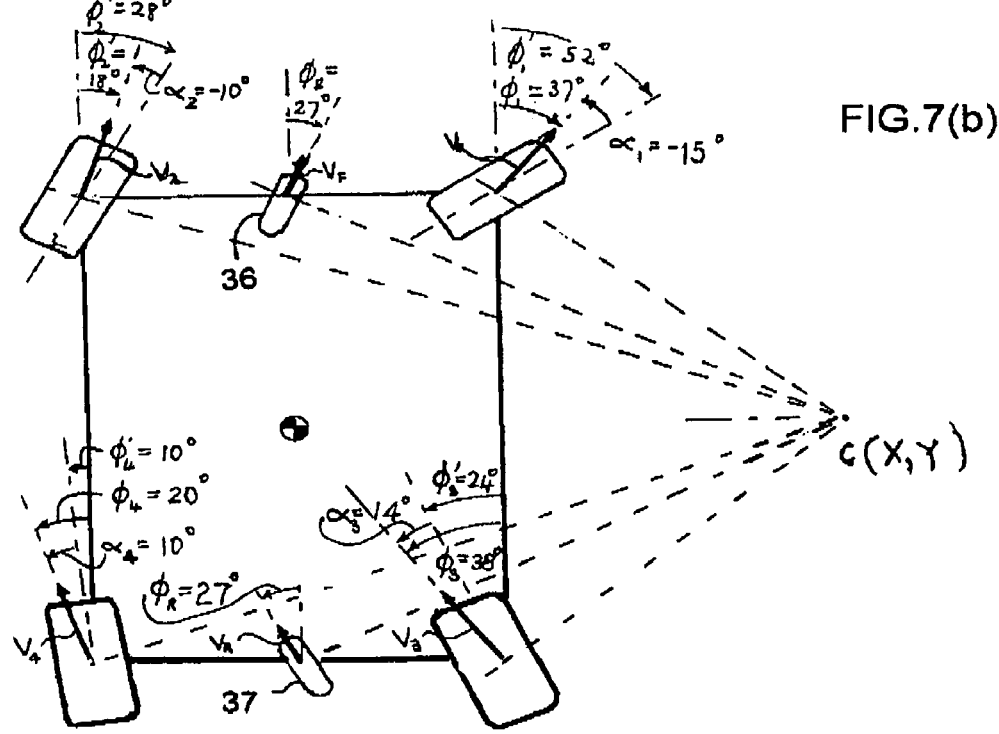
FIG. 7(b) shows the corrected wheel angle configuration when the measured slip angles have been taken into account.

FIG. 7(*a*) shows a vehicle where the speed of both left hand vehicles is identical (i.e. $\omega_2 = \omega_4$), and the speed of both right hand wheels is identical (i.e. $\omega_1 = \omega_3$). The driver selects the desired centre of rotation C' on the transverse axis of the vehicle and the root mean square wheel speed. As slip angles cannot be measured until the vehicle is moving, the computer implements the desired wheel angles and wheel speeds on the assumption that all slip angles and true longitudinal slips are zero. Once the vehicle is moving the front and rear castors (36 and 37 respectively) can be used to determine the actual centre of rotation of the vehicle C. From the latter the slip angles of all four wheels can be calculated by the on-board computer. These slip angles are now added to or subtracted from the original wheel angles and implemented by the computer so that the actual centre of rotation C is moved to the transverse axis of the vehicle. This situation is shown in FIG. 7(*b*). Note that this last step assumes the slip angles are not changed by the small change of wheel angles.

Note also for the symmetrical vehicle shown in FIG. 7 the actual centre of rotation will lie on the transverse axis of the vehicle when the angle of the front and rear castors are equal.

Front and rear castor speeds $V_F$ and $V_R$ can also be measured and effective wheel velocities $V_1$ to $V_4$ can be calculated. Ideally $V_1 \cos \alpha_1 / \omega_1'$, $V_2 \cos \alpha_2 / \omega_2'$, $V_3 \cos \alpha_3 / \omega_3'$ and $V_4 \cos \alpha_4 / \omega_4'$ should all be the same. If not the same $\omega_1' (= \omega_3')$ and $\omega_2' (= \omega_4')$ can be adjusted to minimise the difference.

The last three steps can be repeated to fine tune the process as required.

In the simplified vehicle considered above where the selected value of $R_Y$ equals zero, and the wheelbase b and track t are equal, if all radii of curvature of the path of the vehicle from $+\infty$ to $-\infty$ are to be possible, then the effective wheel angles must be able to be varied from $+45°$ to $-135°$ for the left wheels and $-45°$ to $+135°$ for the right wheels. In short, each wheel must be able to turn a total of $180°$. The latter is the case even when the wheelbase and track are not equal.

Figure 8:
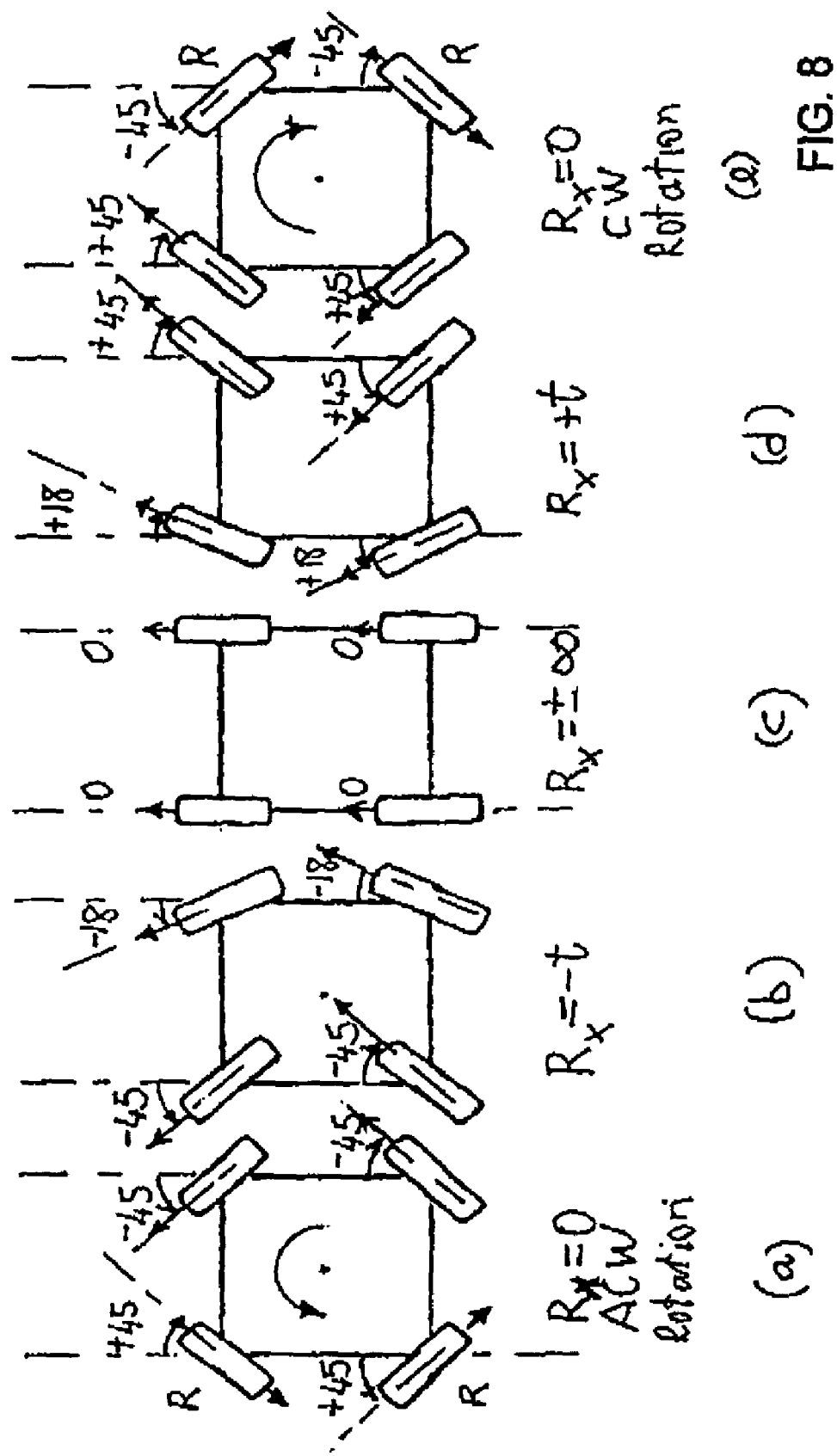
FIG. 8 shows the range of wheel angles required if turning centres dose to the centre of the vehicles are not required.

Although being able to rotate the vehicle about its centre is very desirable, being able to rotate the vehicle about centres close to its centre are not very useful. If the ability to rotate the vehicle about non-zero radii of curvature on its transverse axis between $+t$ and $-t$ are sacrificed, then the wheels only have to turn $+/-45°$. FIG. 8 gives examples of possible wheel configurations for this simplified vehicle.

FIG. 8(*a*) shows the vehicle rotating about its centre in an anti clockwise direction (i.e. $R_X = 0$). In this case the right wheels are turned $-45°$ and run forward, whereas the left wheels are turned $+45°$ and run in reverse. The magnitude of all wheel speeds is the same.

FIG. 8(*b*) shows the vehicle turning anti-clockwise about a centre given by $R_X = -t$. The angles of the left and right hand wheels are $-45°$ and $-18°$ respectively. The speed of the right wheels will be 2.19 times the speed of the left wheels.

FIG. 8(*c*) shows the vehicle moving straight ahead. $R_x = +/-\infty$ and all wheel angles are zero.

FIG. 8(*d*) shows the vehicle turning clockwise about a centre given by $R_X = +t$. The angles of the left and right wheels are $+18°$ and $+45°$ FIG. 8(*e*) shows the vehicle rotating about its centre in a clockwise direction (i.e. $R_X = 0$). In this case the left wheels turn $+45°$ and run forward, whereas the right wheels turn $-45°$ and run in reverse. The magnitude of all wheel speeds is the same.

Note that all values of $R_X$ between $-t$ and $-$infinity and $+t$ and $+$infinity are possible. All other radii are not possible with the exception of $R_X = 0$.

Note that the technique of making the steering effect of wheel speeds identical to the steering effect of the wheel angles can also be applied to braking wheeled vehicles. In the vehicles described above the drive train consists of a motor driving two or more variable displacement hydraulic pumps, which in turn drive four hydraulic wheel motors. These vehicles are decelerated by the driver reducing the strokes of the (usually closed circuit) variable displacement pumps. However the computer integrated steering/drive system ensures that the instantaneous wheel speeds, as well as the wheel angles, tend to rotate the vehicle about the centre selected by the driver. This system will function regardless of whether the vehicle is accelerating, travelling at constant speed or braking. The advantage of this cooperative redundant system is that as one steering system fails (as it inevitably must as operating conditions worsen) it is backed-up (or reinforced) by the other system. This cooperative redundancy will have a stabilising effect on a braking vehicle.

By way of comparison, let us now consider the traditional braking system used by road vehicles. For the sake of simplicity, the engine braking effect and the moment inertia of the wheels will be neglected. Traditionally equal clamping forces are applied to the front wheels and equal clamping forces are applied to the rear wheels. However the frictional torque applied to any wheel cannot exceed the opposing torque applied to the wheel by the ground traversed. When the frictional braking torque equals the maximum torque that can be applied by the ground the wheel will lock.

When the wheel locks the torque exerted by the ground generally decreases. Furthermore the ability of the ground to exert sideways forces on the wheel will also decrease. Since there is no direct control of the speed of each wheel, there is no driver selected steering effect applied by the braking process. Only the wheel angle steering effect is under the control of the driver, and the effectiveness of this will decrease if wheel locking occurs.

Various electronic means have been proposed or implemented to overcome the problems outlined above. One example is a valve to reduce the clamping force applied to the rear wheels to compensate for the weight transfer to the front wheels. Another is an anti-skid braking system which momentarily reduces the damping force applied to all wheels if one or more wheels stop turning. This enables the locked wheels to turn and reestablish their grip on the road and their steering effect.

However, these add-on systems are an attempt to fix an inherently flawed system. It would be much better if the braking system was based on a system of wheel speed control rather than a system based on clamping force control where secondary systems are added in an attempt to overcome inherent instability problems.

Although it is not feasible to use hydrostatic wheel motors in a high speed road vehicle, a computer integrated steering/braking system is possible if the braking system focuses on controlling individual wheel speeds rather than wheel clamping forces. The control strategy to be used is as follows:

1. The driver selects the desired radius of curvature with the steering wheel (or joystick) and root mean square wheel speed or rate of acceleration with the accelerator (or joystick).
2. When deceleration is required the driver selects the desired rate by the force on (or position of) the brake pedal.
3. The on-board computer calculates the speed-time program for each wheel, so that these wheel speeds produce the same steering effect as the wheel angles.
4. To implement the desired speed-time program for each wheel, the clamping force acting on each wheel is modulated. If any wheel speed is too high the clamping force acting on this wheel will be increased. If any wheel speed is too low the clamping force acting on this wheel will be decreased. This can be achieved by means of four high speed valves, similar to Moog valves. Alternatively the wheel clamping force can be controlled by high speed electric motors.

Ideally the vehicle should stop when all the wheels simultaneously stop turning. However if the rate of wheel deceleration selected by the driver is in excess of that that can be produced by the ground/wheel interaction, all wheels will simultaneously stop turning before the vehicle comes to rest.

This problem can be eliminated if an accelerometer on the vehicle detects when the average wheel deceleration exceeds the vehicle deceleration and reduces the individual wheel decelerations accordingly. This system would come into operation into operation in panic braking situations.

Note that a separate anti-lock braking system is not required if the above computer integrated steering/braking system is employed.

Note that in the above derivations neutral steering is assumed so that the centre of rotation of the vehicle will be identical to the centre of curvature of the path of the vehicle.

The General Embodiment of the Invention

Figure 9A:
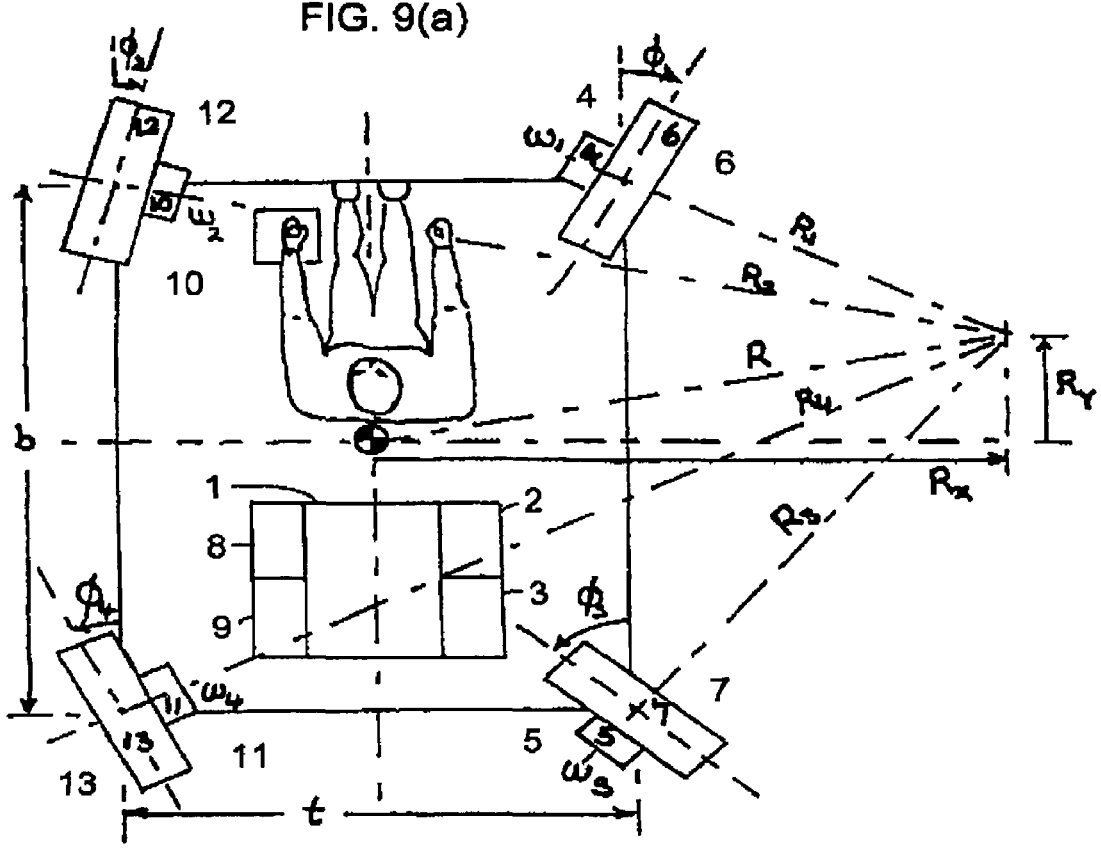
FIG. 9(a) is a plan view of the most general four wheel steering/four wheel drive variant of the invention.
Figure 9B:
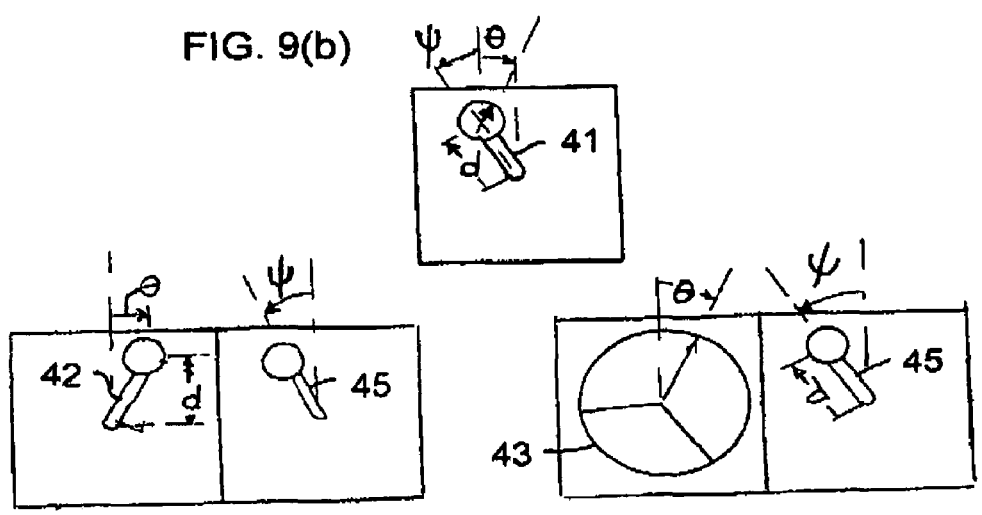
FIG. 9(b) shows three alternative driver interfaces for this vehicle.

The general embodiment of the invention is shown in FIG. 9(a). Alternative means of driver control are shown in FIG. 9(b). The preferred means of driver control is by means of a rotatable joystick 41.

Alternatively, one joystick 42 could be used to determine the radius of curvature of the path of the vehicle and the root mean square wheel speed, and a second joystick 45 could be used to determine the direction of the centre of curvature.

Alternatively a steering wheel 43 (or steering knob or lever) could be used to determine the radius of curvature of the path of the vehicle and the root mean square wheel speed, and a second joystick 45 could be used to determine the direction of the centre of curvature.

A disadvantage of the variant of the invention described above is that four independent steering systems and four independent drive systems are required. It will be shown below that under special conditions the number of systems required can be reduced.

The First Special Case

Figure 10A:
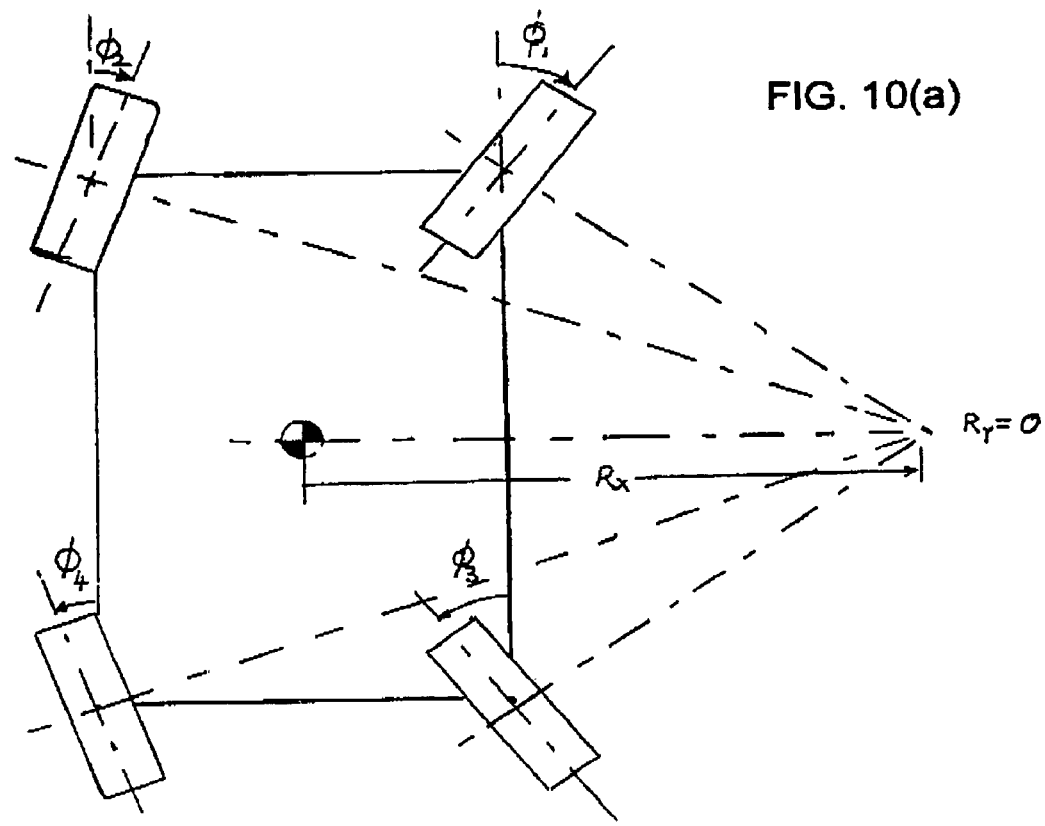
FIG. 10(a) depicts the special case where the centre of curvature of the path of the path of the vehicle lies on the transverse axis of the vehicle.

FIG. 10(a) shows that if $R_Y=0$, the eight general control equations become:

$$\tan \phi_1 = (b/2)/(R_X - t/2)$$

$$\tan \phi_2 = (b/2)/(R_X + t/2)$$

$$\tan \phi_3 = (b/2)/(R_X - t/2) = \tan \phi_1$$

$$\tan \phi_4 = (b/2)/(R_X + t/2) = \tan \phi_2$$

and $\omega_1 = KdR_1/RMSR$ where $R_1^2 = b^2/4 + (R_X - t/2)^2$ $\omega_2 = KdR_2/RMSR$ where $R_2^2 = b^2/4 + (R_X + t/2)^2$ $\omega_3 = KdR_3/RMSR$ where $R_3^2 = b^2/4 + (R_X - t/2)^2 = R_1^2$ $\omega_4 = KdR_4/RMSR$ where $R_4^2 = b^2/4 + (R_X + t/2)^2 = R_2^2$ Where $RMSR = (R_X^2 + b^2/4 + t^2/4)^{1/2}$ In this case only two wheel angle control systems are required since $\phi_1 = \phi_3$ and $\phi_2 = \phi_4$.

Similarly only two wheel speed control systems are required since $\omega_1 = \omega_3$ and $\omega_2 = \omega_4$.

In this case the rotatable joystick only needs to rotate and move forward and backwards in a single plane. In this case the rotatable joystick 41 can be replaced with a normal joystick 42 where the forward displacement d determines the root mean square wheel speed and the lateral displacement determines the radius of curvature of the path of the vehicle where moving the joystick 42 as far as it will go to the right will reduce the radius of curvature to zero and the vehicle will rotate about its own centre in a clockwise direction.

Alternatively a steering wheel 43 can be used by the driver to select the radius of curvature of the path of the vehicle. The root mean square wheel speed can be selected with a speed control lever or pedal 44. See FIG. 2(b).

The Second Special Case

Figure 11A:
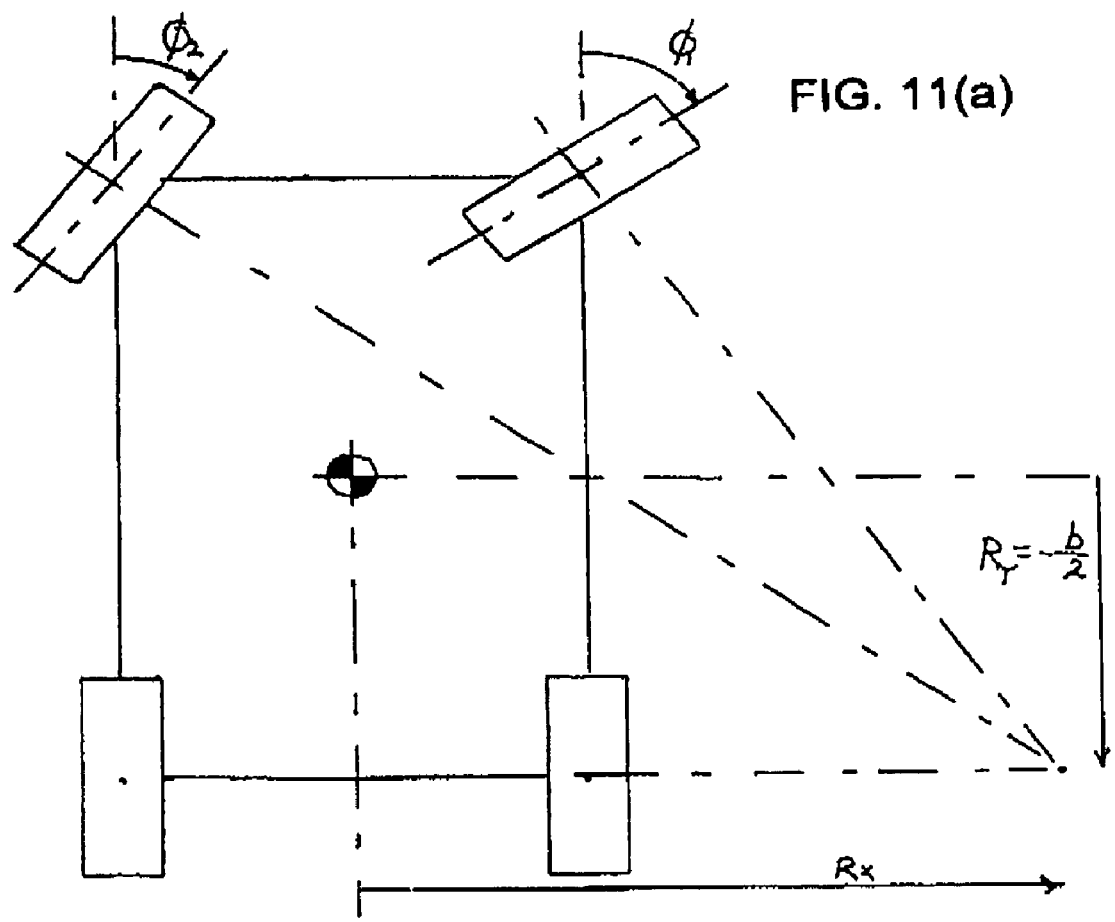
FIG. 11(a) depicts the special case where the centre of curvature of the path of the path of the vehicle lies on the axis of the rear wheels.

FIG. 11(a) shows that if $R_Y=-b/2$, then the eight control equations become:

$$\tan \phi_1 = b/(R_X-t/2)$$

$$\tan \phi_2 = b/(R_X+t/2)$$

$$\tan \phi_3 = \tan \phi_4 = 0$$

$$\omega_1 = KdR_1/RMSR \text{ where } R_1^2 = b^2+(R_X-t/2)^2$$

$$\omega_2 = KdR_2/RMSR \text{ where } R_2^2 = b^2+(R_X+t/2)^2$$

$$\omega_3 = KdR_3/RMSR \text{ where } R_3^2 = (R_X-t/2)^2$$

$$\omega_4 = KdR_4/RMSR \text{ where } R_4^2 = (R_X+t/2)^2$$

$$\text{where } RMSR = (R_X^2+b^2/2+t^2/4)^{1/2}$$

Figure 11B:
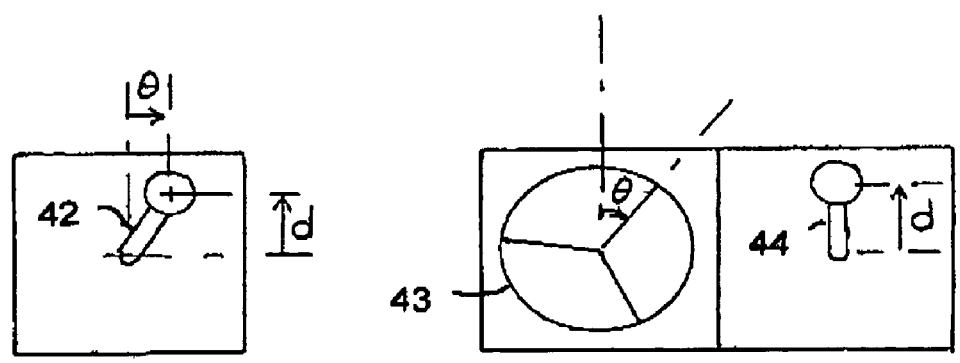
FIG. 11(b) shows two alternative driver interfaces for this vehicle.

In this case no steering system is required for the rear wheels since $\phi_3$ and $\phi_4$ are zero. See FIG. 11(a). The vehicle is further simplified if either the front or rear wheels are not driven (that is are free wheels) so that only two speed control systems are required. See FIGS. 11(b) and 13(b).

Although the same equations apply to the two wheel steering/two wheel drive vehicle as apply to the two wheel steering/four wheel drive vehicle, there is no control imposed on the speed of the free wheels. In this case the speed of these free wheels could be ignored for the purpose of calculating the root mean square wheel speed. If the front wheels are free wheels the RMSR for the rear driving wheels is:

$$RMSR = (R_X^2+t^2/4)^{1/2}$$

If the rear wheels are free wheels the RMSR for the front driven wheels is given by:

$$RMSR = (R_X^2+b^2+t^2/4)^{1/2}$$

The system used to control the wheel angles may work as follows:

The angle of a particular wheel will be measured. An on board computer will calculate (or approximate from a look up table) the correct angle from the driver's inputs of θ and ψ. If an error exists between the actual angle and the desired angle an actuator will be energised so as to eliminate this error. The on board computer will adjust the angles of all the other steerable wheels before repeating the cycle.

A similar system will be used to control the wheel speeds. The wheel speed of a particular wheel will be measured. The on board computer will calculate (or approximate from a look up table) the correct wheel speed from the driver's inputs of θ, ψ and d (the latter determining the root mean square wheel speed). If an error exists between the actual speed and the desired speed the drive to the wheel be adjusted so as to eliminate the error. The on board computer will adjust the speed of all other wheel speeds before repeating the cycle.

In large vehicles the actuators used to turn the wheels could be rotary hydraulic actuators. Alternatively double acting cylinders connected to rack and pinions could be used. In this case the engine 1 would also drive an auxiliary hydraulic pump (not shown in FIG. 1) which would drive the actuators via control valves activated by the on board computer.

In large vehicles the wheels could be driven by in built hydraulic motors which are powered by variable displacement hydraulic pumps. These pumps are driven by an internal combustion engine, which is governed to run at a constant speed. The speed of the wheels is controlled by varying the displacement of the pumps from a maximum flow in one direction to zero to maximum flow in the reverse direction. This allows the speed of the wheels to be varied from maximum forward to zero to maximum in reverse. The on board computer is used to alter the displacement of the pumps to produce the desired wheel speeds.

In smaller vehicles, such as wheel chairs, the wheels could be conveniently driven by electric motors. Similarly the wheels could be turned by electrically powered actuators. Storage batteries could be used to power the motors and the actuators. The motors and actuators would be controlled by an on board computer as indicated above.

Alternatively, the wheels could be driven by an internal combustion engine, via variable ratio friction drives. The wheels could be conveniently be turned by electric actuators. The friction drives and actuators would be controlled with the aid of an on board computer.

In an on road variant of the invention, higher wheel speeds and smaller wheel angles are required. Furthermore the displacement of the centre of curvature in the longitudinal direction is constant. In the four wheel steering/four wheel drive vehicle described in FIGS. 10(a) and 15(a) $R_Y=0$. In the two wheel steering/four wheel drive or two wheel steering/two wheel drive vehicles described in FIGS. 11(a) and 13(b) $R_Y=-b/2$. In these cases the wheel angles could be set by a steering wheel. The on board computer would positively control the wheel speeds to match the wheel angles selected. In this case the drive wheels would be driven mechanically by an internal combustion engine via a gear box and one or more traditional differentials where the wheel speeds are positively controlled by means of one or more steering differentials working in parallel with the one or more of the traditional differentials, where the speed of the electrically or hydraulically driven steering differentials are controlled by the on board computer.

Figure 10B:
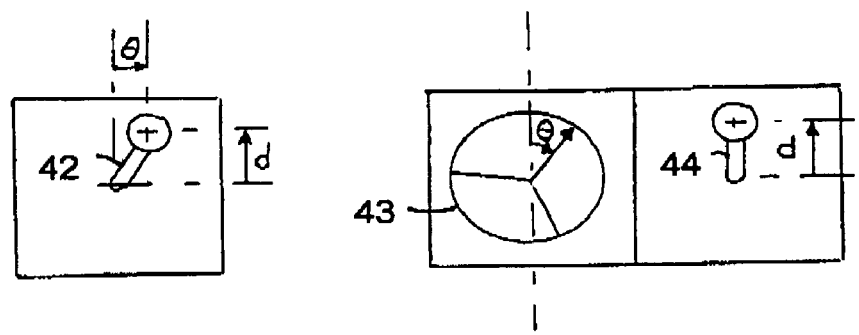
FIG. 10(b) shows two alternative driver interfaces for this vehicle.

Let us consider applying the invention to large dump trucks. In this application fuel efficiency is important and it is known that mechanical drives are more efficient than electrical drives and much more efficient than hydrostatic drives. In this application a zero turn radius is not required, so that the wheels are not required to turn through large angles. The maximum angle required is likely to be less than 30 degrees. In many cases only the front wheels are turned. These limitations make mechanical drives feasible. The preferred driver interface is a steering wheel, where the maximum angle of the steering wheel produces the maximum turn angle of the steerable wheels. Speed can be controlled with a speed control lever or pedal. See FIGS. 10(b) and 11(b).

Figure 12A:
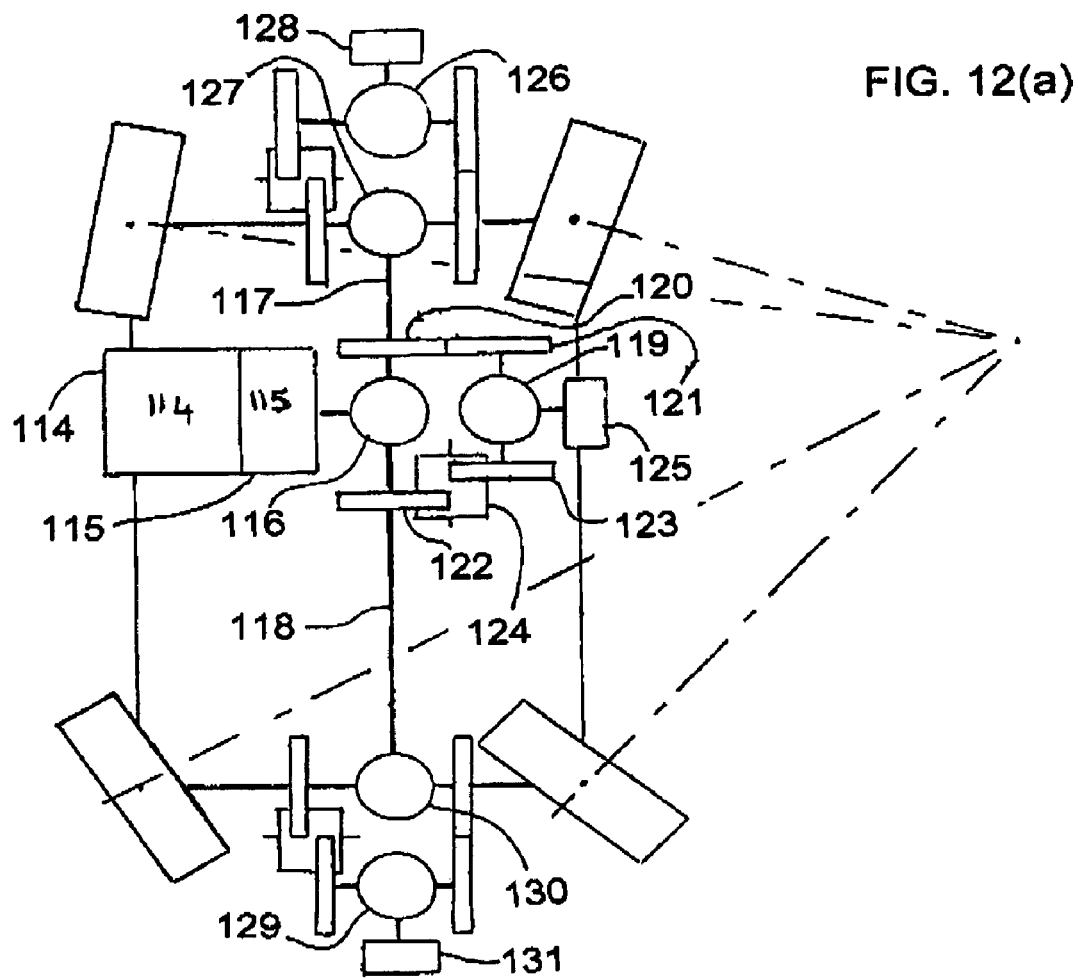
FIG. 12(a) shows the three differentials and three steering differentials required to force all four wheels to rotate at the speeds where their steering effects are identical and identical to the steering effect of all the wheel angles.

FIG. 12(a) shows the general arrangement of components required for computer integrated steering/drive system utilising a mechanical drive. An internal combustion engine 114 drives a gearbox 115 which in turn drives a central differential 116, which in turn drives both a front "tail" shaft 117 and a rear tail shaft 118. The front "tail" shaft 117 is linked to a steering differential 119 by a pair of gears 120 and 121. The rear tail shaft 118 is linked to the steering differential 119 by means of a pair of gears 122 and 123 with the same speed ratio as gears 120 and 121, where gears 122 and 123 do not mesh, but are linked by means of an idler gear 124. The input to the steering differential is driven as required by means of a hydraulic motor 125. Note that when the vehicle is proceeding straight ahead (i.e $R_X$=infinity), the speed of the two tail shafts should be identical. This is positively achieved if the hydraulic motor 125 is stationary.

When the vehicle turns it may be necessary for the speed of the front tail shaft 117 to be greater than the speed of the rear tail shaft 118 if wind up is to be avoided. This can be achieved by driving the hydraulic motor 125 at the right speed (in the right direction).

A steering differential 126 is also linked in parallel with the front differential 127. This is driven at the appropriate speed by a hydraulic motor 128. A steering differential 129 is also linked in parallel with the rear differential 130. This steering differential 129 is also driven at the appropriate speed by a hydraulic motor 131. Note that the front and rear differentials are driven by front and rear tail shafts 117 and 118 respectively. The appropriate speeds are those where the steering effect of all the wheel speeds is identical to the steering effect of all the wheel angles.

Figure 12B:
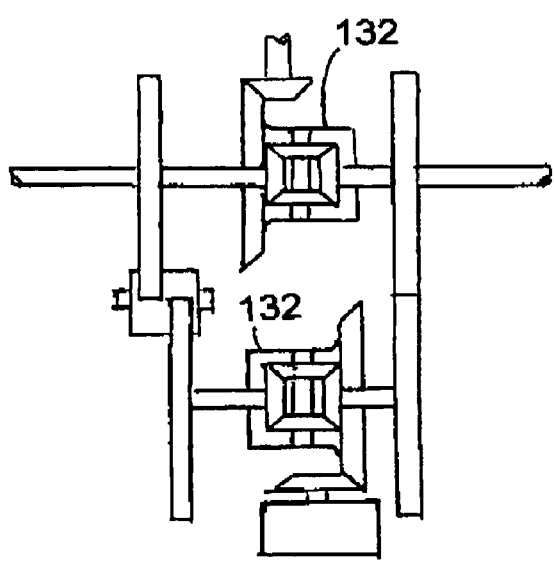
FIG. 12(b) shows the detailed structure of each differential and its associated steering differential.

FIG. 12(b) shows the detailed layout of the rear differential 130 and the associated steering differential 129. The casings (or housings) have been omitted in the interests of clarity. Although bevel gear differentials 132 have been shown here, differentials using over lapping straight cut planetary gears can also be used.

Figure 13A:
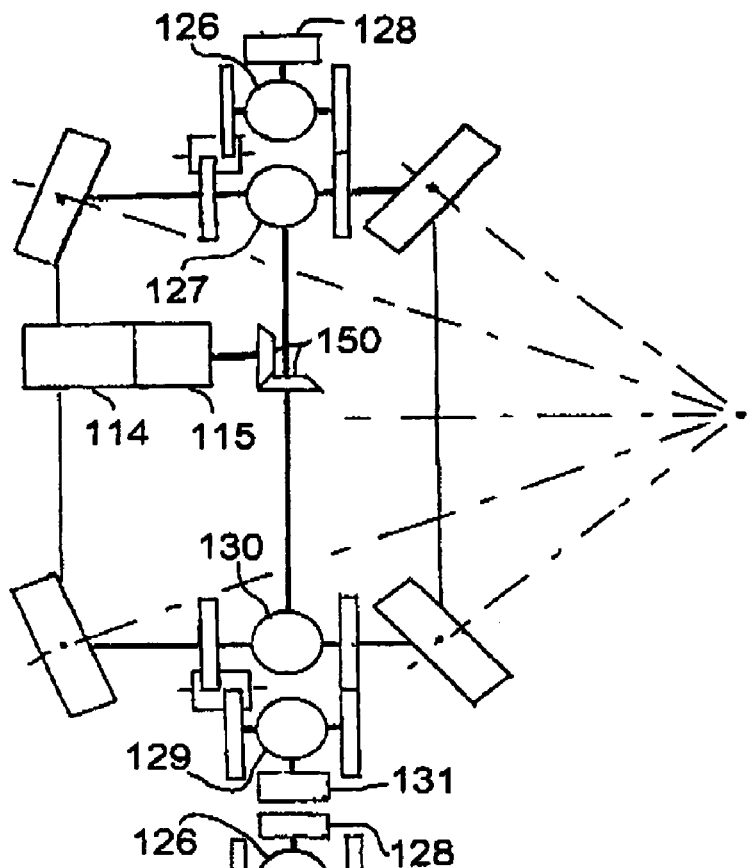
FIG. 13(a) shows that when the centre of curvature of the path of the vehicle lies on the transverse axis of the vehicle, the central differential and associated steering differential are not required.

FIG. 13(a) shows the layout for the mechanical drive when the centre of curvature of the path of the path of the vehicle lies on its transverse axis. In this case the central differential and its associated steering differential can both be dispensed with.

Figure 13B:
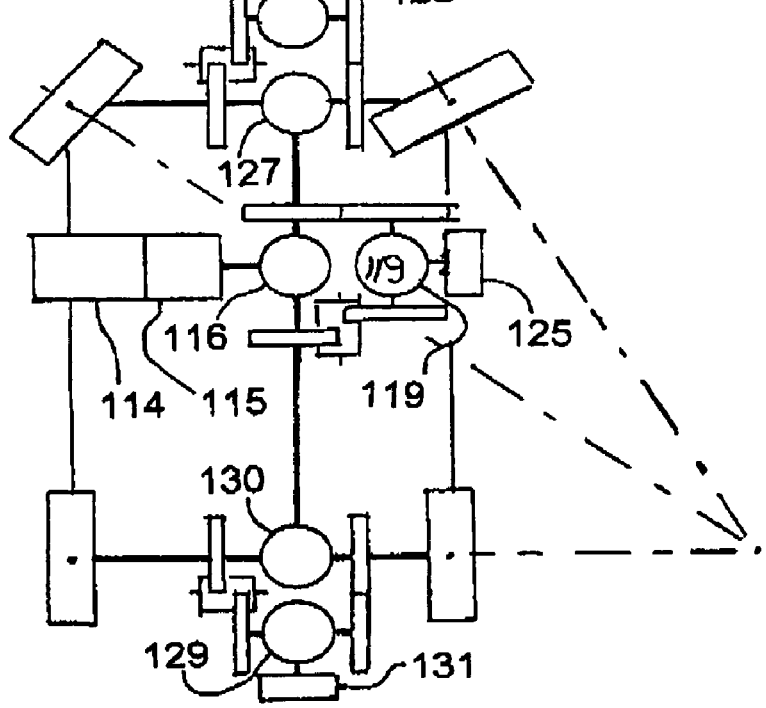
FIG. 13(b) shows that when the centre of curvature of the path of the vehicle lies on the axis of the rear wheels, three differentials and three associated steering differentials are required.
Figure 13C:
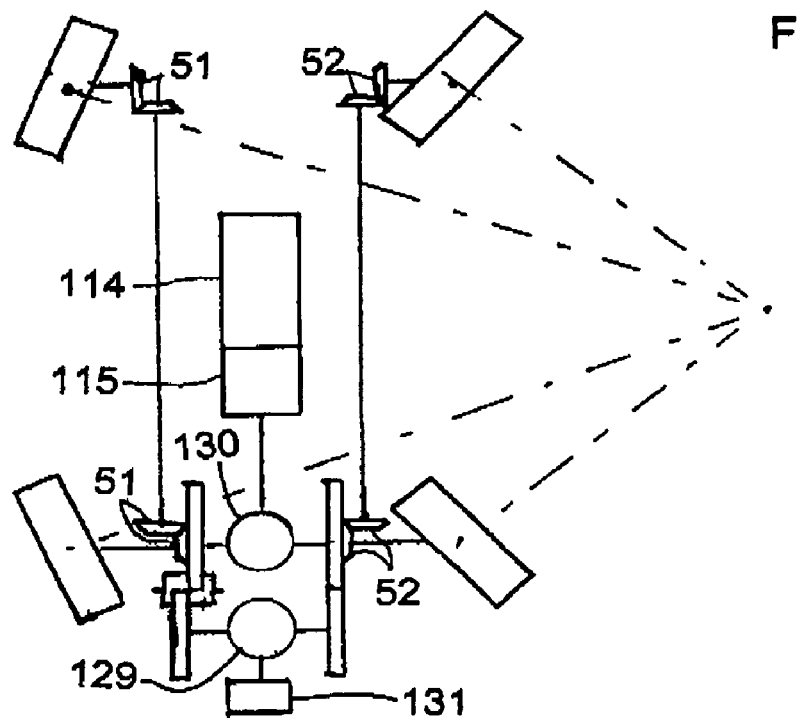
FIG. 13(c) shows that when the centre of curvature of the path of the vehicle lies on the transverse axis of the vehicle, the front differential and associated steering differential can be replaced with two pair of right angle drives.

FIG. 13(c) shows that when the centre of curvature of the path of the vehicle lies on the transverse axis of the vehicle the front differential 127 and associated steering differential 126 can be replaced with a pair of left hand right angle drives 51 and a pair of right hand right angle drives 52.

Figure 13D:
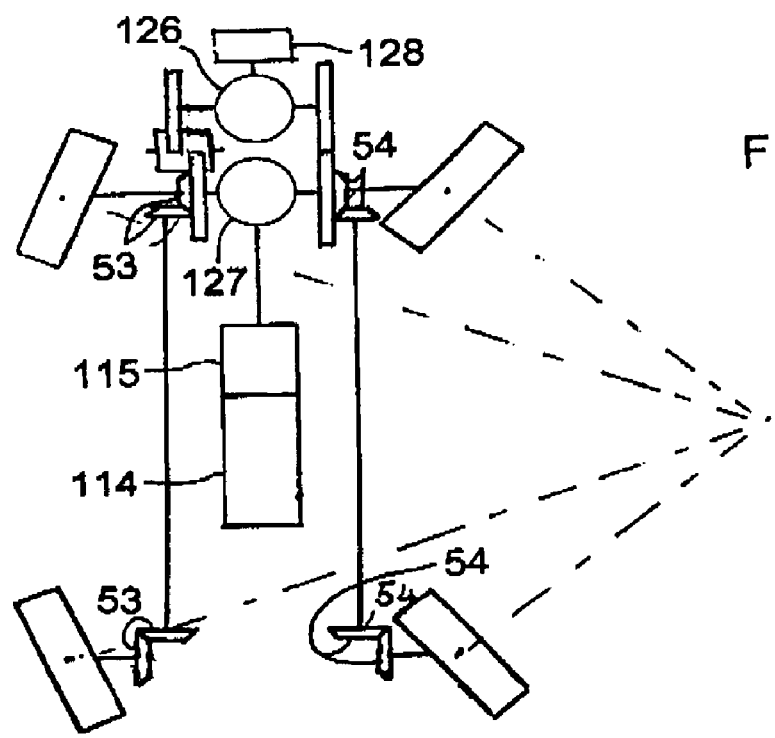
FIG. 13(d) shows that when the centre of curvature of the path of the vehicle lies on the transverse axis of the vehicle, the rear differential and associated steering differential can be replaced with two pair of right angle drives.

FIG. 13(d) shows that when the centre of curvature of the path of the vehicle lies on the transverse axis of the vehicle the rear differential 130 and associated steering differential 129 can be replaced with a pair of left hand right angle drives 53 and a pair of right hand right angle drives 54.

FIG. 13(b) shows that when the centre of curvature of the path of the vehicle lies on the axis of the rear wheels, three differentials 116, 127 and 130 and their associated steering differentials 119, 126 and 129 are required.

Figure 14A:
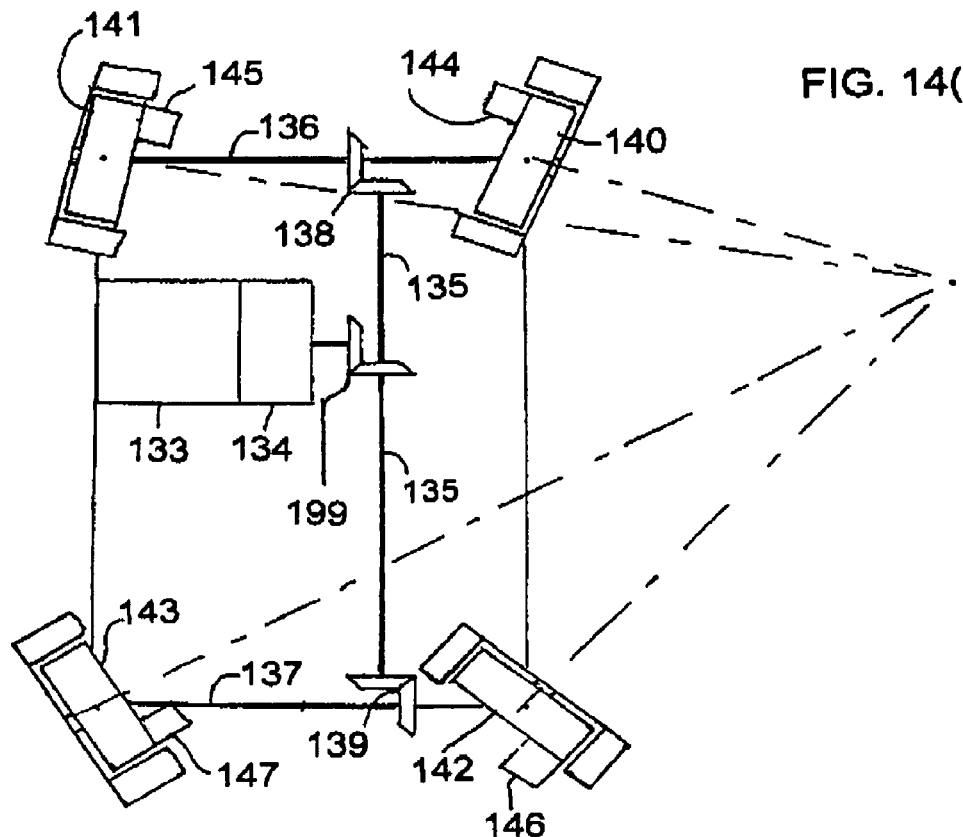
FIG. 14(a) shows a four wheel steering/four wheel drive vehicle where four steering differentials are integrated with four speed reduction gearboxes dose coupled to the wheels.

FIG. 14(a) shows the layout of a vehicle incorporating a computer integrated steering/drive system where the differentials and associated steering differentials have been replaced with steering differentials integrated into speed reduction gear boxes close coupled to each wheel. In this case engine 133 drives gearbox 134 which in turn drives an integrated front and rear tail shaft 135 by means of right angle drive 199 which in turn drives front and rear shafts 136 and 137 by means of right angle drives 138 and 139. The front and rear drive shafts 136 and 137 drive integrated speed reduction gearbox/speed correcting differentials 140, 141, 142 and 143. Each integrated speed reduction gearbox/speed correcting differential is also driven by one of the speed correcting hydraulic motors 144, 145, 146 or 147.

Figure 14B:
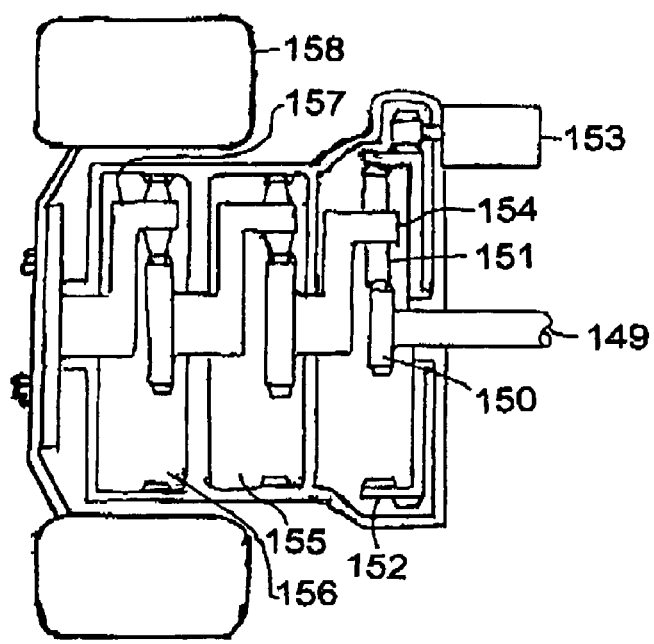
FIG. 14(b) shows the construction of an integrated speed reduction gearbox/steering differential.

FIG. 14(b) shows the detailed layout of the integrated speed reduction gearbox/speed correcting differential. This is a three stage compound epicyclic gearbox where the speed correcting differential is incorporated into the first stage. Power is transmitted to the integrated speed reduction gearbox/speed correcting differential by means of drive shaft 149, which drives sun gear 150. Sun gear 150 drives planet gear 151, which is also driven by annular gear 152. Annular gear 152 is driven by the speed correcting hydraulic motor 153 as required. Planet gear 151 is supported by arm (or cage) 154, which drives the sun gear of stage two 155. Stage two 155 and stage three 156 are similar to stage one, except that the annular gears in the latter two stages are fixed to the housing and are thereby stationary. The arm (or cage) 157 of the last stage is connected to the drive wheel 158. For the sake of simplicity only one planet gear is shown in each stage. In practice more planet gears would be used to both balance the rotating parts and share the load.

In principle the hydraulic speed correcting motor could drive any one of the three annular gears. However if the first stage annular gear is driven, a more convenient higher speed low torque hydraulic motor can be used. Note that the hydraulic motor could be replaced by an electric motor with appropriate speed control.

Note that the lower efficiency of the speed correcting hydraulic motor will have little effect on the overall drive efficiency since only a small fraction of the output power is provided by the hydraulic motor.

Figure 15:
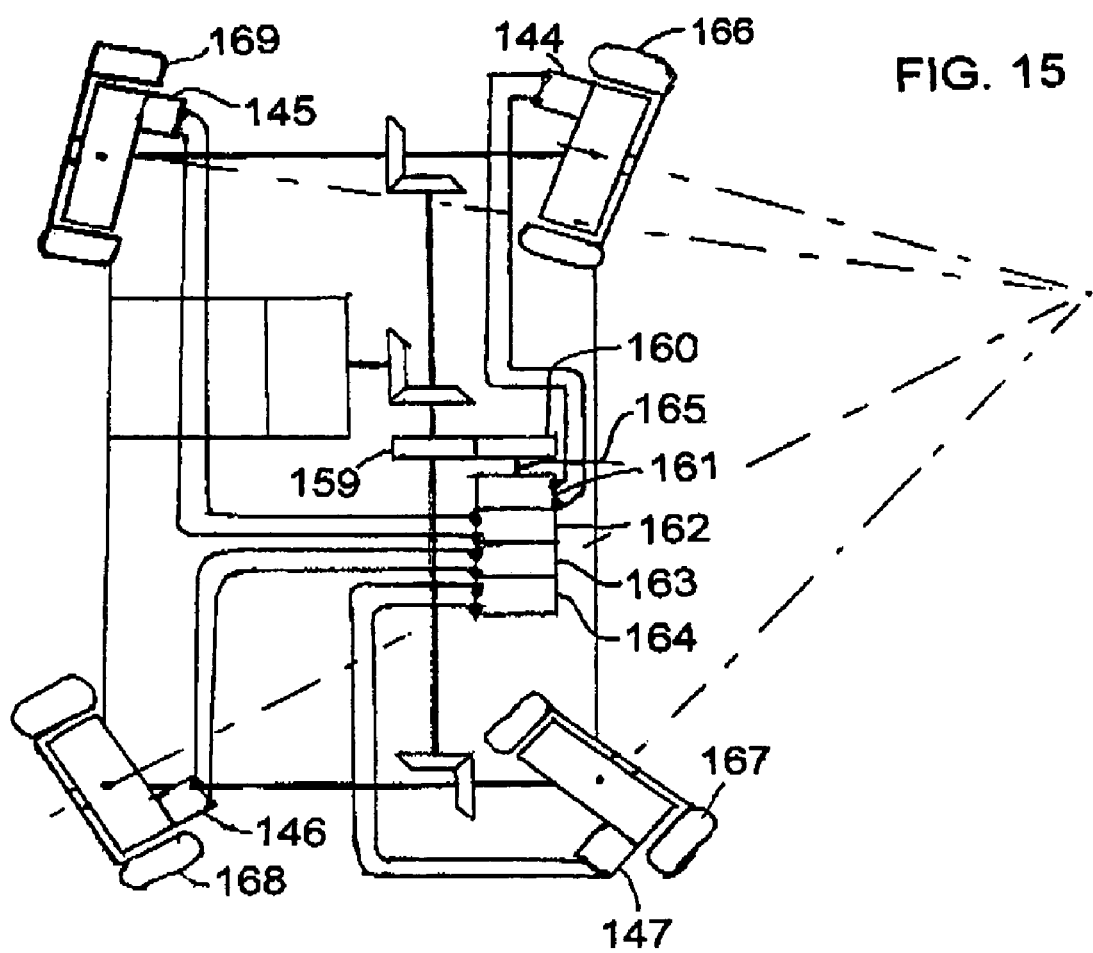
FIG. 15 shows the layout of the hydrostatic drives to the steering motors.

FIG. 15 shows a hydraulic circuit which would allow the wheel speed correcting motors 144, 145, 146 and 147 to rotate at appropriate speeds. Each hydraulic motor is driven by a variable displacement pump. These pumps 161, 162, 163 and 164 are driven by a common shaft 165 at a speed proportional to the tail shaft speed by means of gears 159 and 160. This arrangement automatically compensates the speed of the pumps for the overall speed of the vehicle. When the vehicle is turning to the right, the right hand pumps slow the right hand wheels and the left hand pumps speed up the left hand wheels. The amount of speeding up and slowing down is determined by the displacement of each of the variable displacement pumps. These displacements are determined by the squash plate angle of each pump.

In the vehicles depicted in FIGS. 12 and 13 the computer integrated steering/drive system can be implemented as follows:

The driver selects the centre of curvature of the path of the vehicle and the average wheel speed. The on board computer then calculates the angle and speed of each wheel that ensures that the steering effect of the wheel angles is identical to the steering effect of the wheel speeds. The on board computer then turns the wheels 166, 167, 168 and 169 to the calculated angles. The computer also calculates the appropriate speed for each wheel speed correcting hydraulic motors 144, 145, 146 and 147, and implements these speeds by adjusting the squash plate angles of the respective variable displacement hydraulic pumps 161, 162, 163 and 164.

Figure 16A:
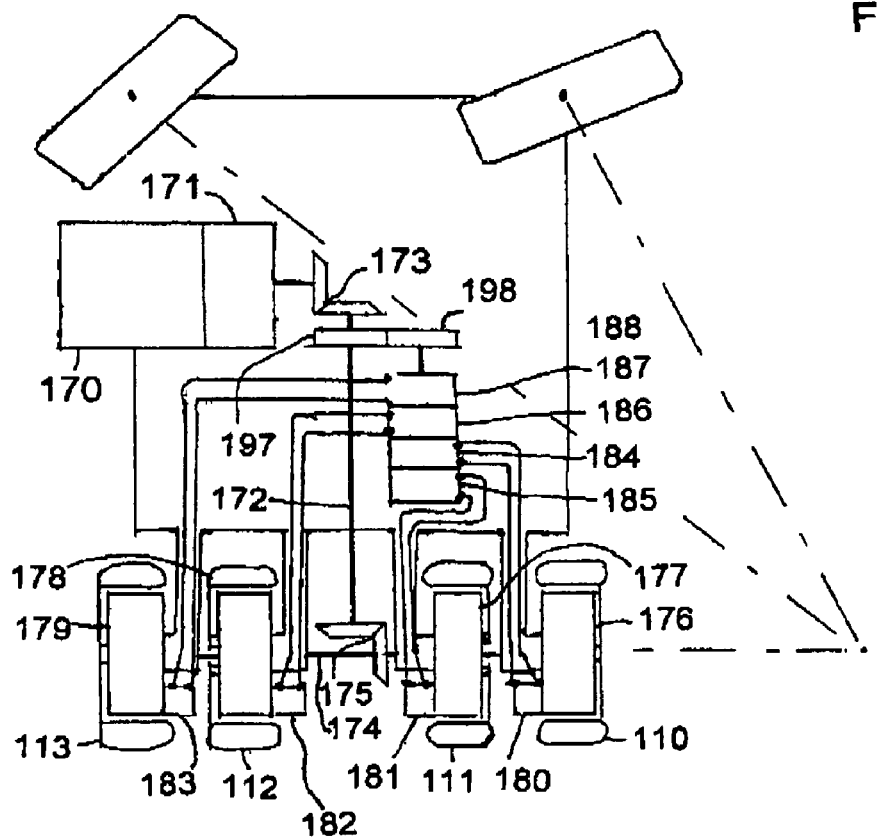
FIG. 16(a) shows the layout of the hydrostatic drive to the steering motors close coupled to the four rear wheels where the steering effect of the speed of all four wheels is identical to the steering effect of the angles of all six wheels.

FIG. 16(a) depicts a vehicle where the four rear drive wheels are driven independently so that the wheel speed steering effect of all four wheels is identical to the steering effect of the angles of all six wheels (i.e. the four coaxial drive wheels, and the two steerable non driven wheels).

In this vehicle engine 170 drives gearbox 171, which in turn drives a tail shaft 172 via right angle drive 173. The tail shaft 173 drives a drive shaft 174 via a second right angle drive 175. The drive shaft 174 drives four integrated speed reduction gearbox/speed correcting differentials 176, 177, 178 and 179. The speed correcting differentials 176, 177, 178 and 179 are also driven as required by four wheel speed correcting hydraulic motors 180, 181,182 and 183. These hydraulic motors 180, 181, 182 and 183 are driven by variable displacement hydraulic pumps 184, 185, 186 and 187 respectively. These hydraulic pumps are driven by a common shaft 188, which is rotated at a speed proportional to the tail shaft speed by means of gears 197 and 198. The advantage of this arrangement is that it enables all four drive wheels to be positively driven at slightly different speeds on turning. The outer wheels 110 and 113 may be slowed down and speeded up more than the inner wheels 111 and 112.

Figure 16B:
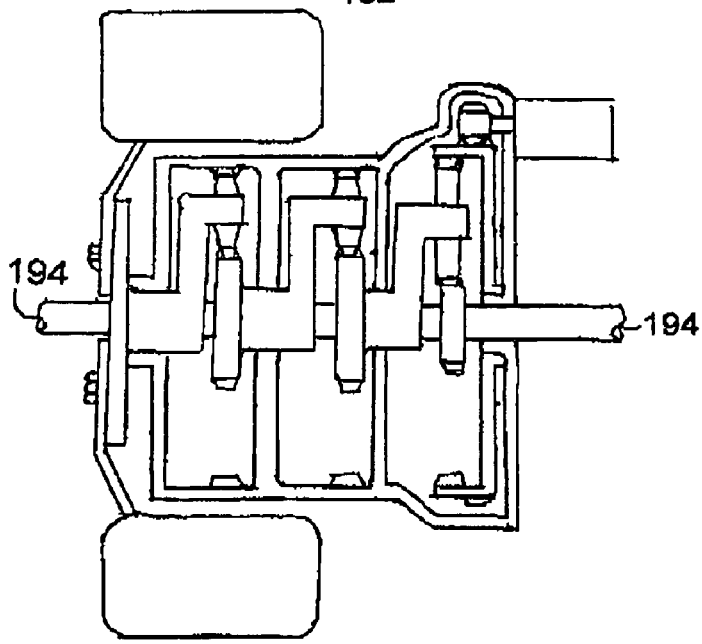
FIG. 16(b) shows the construction of an integrated speed reduction gearbox/steering differential suitable for driving an inner drive wheel.

FIG. 16(*b*) shows the detailed layout of an integrated speed reduction gear box/speed correcting differential suitable for driving an inner wheel. In this case the drive shaft 194 must pass through the inner integrated speed reduction gearbox/speed correcting differential so that it can also drive the outer integrated speed reduction gearbox/speed correcting differential.

Figure 17:
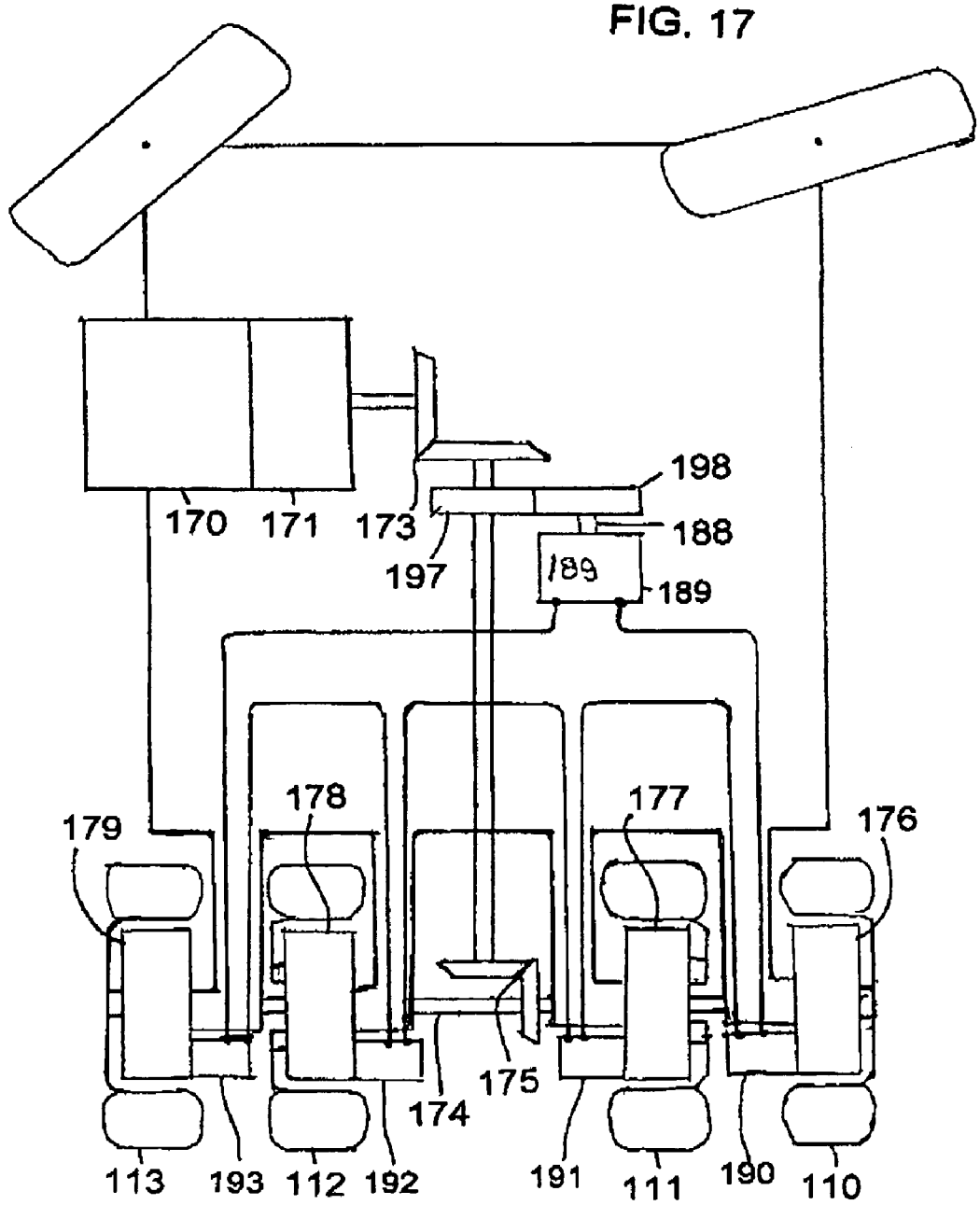
FIG. 17 shows the layout of a simplified hydrostatic drive to the steering motors close coupled to the four rear wheels.

FIG. 17 shows a simplified version of a vehicle where the four rear drive wheels are driven at four different speeds on turning. In this case a single variable displacement hydraulic pump 189 is used to drive all four speed correcting hydraulic motors 190, 191, 192 and 193, which are now connected in series. The displacement of the inner and outer speed correcting hydraulic motors is inversely proportional to the distance of the respective wheels from the centre line of the vehicle.

In the vehicles depicted in FIGS. 16 and 17 the computer integrated steering drive system can be implemented as follows:

The driver selects the radius of curvature of the path of the vehicle with a steering wheel and the average wheel speed with a speed control lever or pedal. The on board computer calculates the appropriate angles of the front wheels and the individual speeds of the four rear drive wheels, and the required speed of the four wheel speed correcting hydraulic motors 180, 181, 182 and 183 or 190, 191, 192 and 193. The computer implements the calculated front wheel angles and calculated hydraulic motor speeds. The required hydraulic motor speeds are achieved by adjusting the squash plate angles of the four variable displacement pumps 184, 185, 186 and 187 or the single variable displacement pump 189.

It should be noted that if the speed of the drive wheels is positively controlled by any of the methods outlined above, the wheel speed steering effect applies when the vehicle is being braked (or decelerated) as well as when the vehicle is being driven (or accelerated).

The claims defining the invention are as follows:

1. A vehicle having four or more wheels of substantially the same diameter, wherein:
   At least two wheels are independently driveable at a specific rotational velocity about their own wheel axis and at least two wheels are independently turnable about a substantially vertical axis to specific steering angles relative to a longitudinal axis of said vehicle;
   said vehicle includes a first joystick pivotable by a user from a neutral position in any direction relative to said longitudinal axis so as to provide a first demand signal for movement of said vehicle in a path that is instantaneously aligned with said direction; and
   said vehicle includes a further control means operable by said user to provide a second demand signal specifying a radius of curvature of said path,
   and wherein said vehicle includes a control system that adjusts both the effective rotational velocity and the effective steering angle of each wheel so as to execute travel of said vehicle along said path in response to said first and second demand signals.

2. A vehicle according to claim 1 including four rectangularly arranged wheels, wherein said further control means comprises a part of said first joystick that is rotatable by said user about a longitudinal axis of said joystick from a neutral angular position to provide said second demand signal, and wherein said control system adjusts the rotational velocity and steering angle of each said wheel according to the following equations:

$$R/t = \cot(90°\theta/\theta_{max}) = (R_X^2 + R_Y^2)^{1/2}/t;$$

$$\tan \Psi = R_Y/R_X;$$

$$R_Y = R/(\tan^2 105 + 1)^{1/2} = R \sin \Psi;$$

$$R_X = R \tan \Psi/(\tan^2 \Psi + 1)^{1/2} = R \cos \Psi;$$

$$\tan \phi_1 = (b/2 - R_Y)/(R_X - t/2) = \tan(\Phi'_1 + \alpha_1);$$

$$\tan \phi_2 = (b/2 - R_Y)/(R_X + t/2) = \tan(\Phi'_2 + \alpha_2);$$

$$\tan \phi_3 = (b/2 + R_Y)/(R_X - t/2) = \tan(\Phi'_3 + \alpha_3);$$

$$\tan \phi_4 = (b/2 - R_Y)/(R_X + t/2) = \tan(\Phi'_4 + \alpha_4);$$

$$\omega_1 = KdR_1/RMSR = \omega_1' \exp[-1_1] \text{ where } R_1^2 = (b/2 - R_Y)^2 + (R_X - t/2)^2;$$

$$\omega_2 = KdR_2/RMSR = \omega_2' \exp[-1_2] \text{ where } R_2^2 = (b/2 - R_Y)^2 + (R_X + t/2)^2;$$

$$\omega_3 = KdR_3/RMSR = \omega_3' \exp[-1_3] \text{ where } R_3^2 = (b/2 - R_Y)^2 + (R_X - t/2)^2;$$

$$\omega_4 = KdR_4/RMSR = \omega_4' \exp[-1_4] \text{ where } R_4^2 = (b/2 - R_Y)^2 + (R_Y + t/2)^2;$$

Where RMSR is the root mean square radius which is given by the equation:

$$RMSR = (R_1^2 + R_2^2 + R_3^2 + R_4^2)^{1/2}/2 = (R_X^2 + R_Y^2 + t^2/4 + b^2/4)^{1/2};$$

and RMSWS is the root mean square wheel speed which is given by the equation:

$$RMSWS = Kd = (\omega_1^2 + \omega_2^2 + \omega_3^2 + \omega_4^2)^{1/2}/2:$$

where $\omega_1$ and $\phi_1$ are the rotational velocity end the steering angle (clockwise positive) of the front right hand wheel respectively $\omega_2$ and $\phi_2$ a are the rotational velocity and the steering angle (clockwise positive) of the front left hand wheel respectively $\omega_3$ and $\phi_3$ are the rotational velocity end the steering angle (anticlockwise positive) of the rear right hand wheel respectively $\omega_4$ and $\phi_4$ are the rotational velocity end the steering angle (anticlockwise positive) of the rear left hand wheel respectively R is the radius of curvature of the path of the vehicle $R_X$ is the distance of the centre of curvature of the path of the vehicle to the right of the vehicle centre $R_Y$ is the distance of the centre of curvature of the path of the vehicle forward of the vehicle centre b is the wheel base of the vehicle t is the track of the vehicle $R_1$, $R_2$, $R_3$ and $R_4$ are the distances of the front right hand wheel, the front left hand wheel, the rear right hand wheel and the mar left hand wheel respectively from the centre of curvature of the path of the vehicle, d is the displacement of the first joy stick, where the centre of curvature of the path of the vehicle is at right angles to the direction of displacement of the first joystick $\Psi$ is the angle of displacement of the joystick to the left of the straight ahead position K is a suitable constant $\theta$ is the angle of rotation of the first joystick, and $\theta_{max}$ is the maximum angle of rotation of the first joystick.

3. A vehicle according to claim 2 having four wheels and wherein said further control means includes a wheel, lever, knob or second joystick.

4. A vehicle according to claim 2, where the values of the longitudinal slip and slip angle corrected for in the control equations are deduced from the forces acting on each wheel where these forces are measured continuously by means of a triaxial load cell interposed between each wheel and the chassis of the vehicle.

5. A vehicle according to claim 4, where the value of the slip angle α' corrected for in the wheel angle control equations is given by the equation:

$$\alpha = F_x/C_\alpha;$$

Where $F_x$ is the cornering force acting on the wheel and $C_\alpha$ is the cornering stiffness, which is given by the equation:

$$C_\alpha = (dF_x/d\alpha)_{\alpha \to 0} = K_n F_z{}^n K_n';$$

Where $K_n$, and $K_n'$ and constants which characterise the tyre, and $F_z$ is the vertical force acting on the wheel, (where n will generally) lie between 0.5 and 0.8;

$$\text{Thus } \alpha' = F_x/(K_n F_z{}^n + K_n').$$

6. A vehicle according to claim 2, where the value of longitudinal slip corrected for in the wheel speed control equations is given by:

$$i' = F_y/C_s$$

Where $C_s$ is the gradient of the longitudinal force $F_y$ versus longitudinal slip curve, and is given by:

$$C_s = (dF_y/di)_{i \to 0} = K_m F_z{}^m + K_m'$$

Where $k_m$, $K_m'$ and m are parameters which characterise the tyre;

$$\text{Thus } i' = F_y/(K_m F_z{}^m + K_m').$$

7. A vehicle according to claim 6, where the forces acting on each wheel are measured by means of triaxial load cells which turn with the wheels so that the cornering force $F_x$, the tractive force $F_y$ and the vertical force $F_z$ are measured directly regardless of wheel angle.

8. A vehicle according to claim 6, where the forces acting on each wheel are measured by means of triaxial load cells fixed to the chassis of the vehicle so that the longitudinal force $F_y'$, the transverse force $F_x'$, and $F_z$ exerted on the chassis by each wheel are converted to the forces relative to the wheel $F_x$, $F_y$ and $F_z$ according to the equations:

$$F_y = F_y' \cos \phi' + F_x' \sin \phi';$$

$$F_x = F_y' \cos \phi' + F_y' \sin \phi';$$

$$F_z = F_z' \text{ where } \phi' \text{ is the actual wheel angle.}$$

9. A vehicle according to claim 2, where the centre of curvature of the path of the vehicle and its rate of rotation about this centre art measured with the aid of dummy casters located at opposite ends of the vehicle, where the effective angle of each wheel can be deduced from the said centre and the actual wheel angles, and where the effective speed of each wheel can be deduced from the said centre and the rate of rotation of the vehicle about this centre.

10. A vehicle according to claim 9, where the coordinates of the centre of curvature of the path of the vehicle $R_x$ and $R_y$ are calculated from the equations;

$$R_X = b/(\tan \phi_R + \tan \phi_F)$$

$$\text{And } R_Y = b(\tan \phi_R - \tan \phi_F)/2(\tan \phi_R + \tan \phi_F):$$

where $R_X$ is the distance of the centre of curvature of the path of the vehicle to the right of the longitudinal axis of the vehicle, $R_Y$ is the distance of the centre of curvature of the path of the vehicle forward of the transverse axis of the vehicle, b is the wheel base and $\phi_R$ and $\phi_F$ are the angles of the rear and front castors respectively, so that the effective wheel angles are given by the equations:

$$\tan \phi_1 = \tan(\phi_1' + \alpha_1) = \tan \phi_F/(1 - t(\tan \phi_R + \tan \phi_F)/2b);$$

$$\tan \phi_2 = \tan(\phi_2' + \alpha_2) = \tan \phi_F/(1 + t(\tan \phi_R + \tan \phi_F)/2b);$$

$$\tan \phi_3 = \tan(\phi_3' + \alpha_3) = \tan \phi_R/(1 - t(\tan \phi_R + \tan \phi_F)/2b);$$

$$\tan \phi_4 = \tan(\phi_4' + \alpha_4) = \tan \phi_R/(1 + t(\tan \phi_R + \tan \phi_F)/2b);$$

And the effective velocities of the wheels across the ground are given by the equations:

$$V_1 = V_F(R_x - t/2) \cos \phi_F/R_x \cos \phi_1;$$

$$V_2 = V_F(R_x + t/2) \cos \phi_F/R_x \cos \phi_2;$$

$$V_3 = V_R(R_x + t/2) \cos \phi_R/R_x \cos \phi_3;$$

$$V_4 = V_R(R_x - t/2) \cos \phi_R/R_x \cos \phi_4.$$

11. A simplified vehicle according to claim 10, where both left hand wheels are driven at the same speed and where both the right hand wheels are driven at the same speed where conflict between the wheel angle steering system and the wheel speed steering system is minimised by ensuring that the effective centre of curvature of the path of the path of the vehicle lies on the transverse axis of the vehicle, where this is achieved by detecting the actual centre of curvature by means of the front and rear castors located midway between the front and rear driven wheels respectively and adjusting the actual wheel angles until the desired centre is achieved when both the angles and speeds of the front and rear castors are identical.

12. A simplified vehicle according to claim 11, where the total angle through which the wheels can be turned is limited to (say) 90 degrees, so that a continuous variation of $R_X$ from $-\infty$ to $-(b//2+t/2)$ and from $+(b/2+t/2)$ to $+\infty$, is achievable, where a value of $R_X = 0$ can also be achieved by turning the left and right driven wheels in opposite directions and driving the wheels on one side in reverse.

13. A vehicle according to claim 6, where the actual angle of the wheels is corrected for the linear portion of the slip angle of each wheel so that the effective angle of each wheel will be closer to the ideal effective angle of each wheel so that the effective centre of curvature of the path of the vehicle is moved closer to the ideal centre selected by the driver, where the linear portion of the slip angle is estimated from measurements of the vertical and transverse forces acting on each wheel and the characteristics of the tyres used.

14. A vehicle according to claim 9, where the actual angle of the wheels is corrected for the slip angle of each wheel so that the effective angle of each wheel will be closer to the ideal effective angle of each wheel so that the effective centre of curvature of the path of the vehicle is moved closer to the ideal centre selected by the driver, where the slip angle of each wheel is deduced from the position of the centre of curvature of the path of the vehicle, where the latter is deduced from the angles and speeds of two dummy castors located at opposite ends of the vehicle.

15. A vehicle according to claims 6, where the actual speed of the wheels is corrected for the linear portion of the longitudinal slip of each wheel so that the effective speed of each wheel will be closer to the ideal effective speed of each wheel so that the effective centre of curvature of the path of the vehicle is moved closer to the ideal centre selected by the driver, where the linear portion of the longitudinal slip is estimated from measurements of the vertical and longitudinal forces acting on each wheel and the characteristics of the tyres used.

16. A vehicle according to claim 9, where the actual speed of the wheels is corrected for the longitudinal slip of each wheel so that the effective speed of each wheel will be closer to the ideal effective speed of each wheel so that the effective centre of curvature of the path of the vehicle is moved closer to the ideal centre selected by the driver, where the longitudinal slip of each wheel is deduced from the position of the centre of curvature of the path of the vehicle and the rate of rotation of the vehicle about this centre, where the latter two parameters are deduced from the angles and speeds of two dummy castors located at apposite ends of the vehicle.

* * * * *